(12) United States Patent
Yamamoto et al.

(10) Patent No.: US 8,392,316 B2
(45) Date of Patent: Mar. 5, 2013

(54) TRANSACTION MANAGEMENT DEVICE AND READABLE STORAGE MEDIUM

(75) Inventors: Hisatoshi Yamamoto, Tokyo (JP); Hitsohi Aiba, Tokyo (JP)

(73) Assignee: Money Square Japan Inc., Tokyo (JP)

( * ) Notice: Subject to any disclaimer, the term of this patent is extended or adjusted under 35 U.S.C. 154(b) by 79 days.

(21) Appl. No.: 12/937,464

(22) PCT Filed: Dec. 25, 2009

(86) PCT No.: PCT/JP2009/071565
§ 371 (c)(1),
(2), (4) Date: Oct. 12, 2010

(87) PCT Pub. No.: WO2010/074217
PCT Pub. Date: Jul. 1, 2010

(65) Prior Publication Data
US 2011/0161221 A1     Jun. 30, 2011

(30) Foreign Application Priority Data
Dec. 26, 2008   (JP) ................................. 2008-332601

(51) Int. Cl.
*G06Q 40/00*   (2012.01)
(52) U.S. Cl. ............. 705/37; 705/35; 705/36 R; 705/38; 705/26.3
(58) Field of Classification Search ............. 705/35, 705/36 R, 37, 38, 26.3; 117/30
See application file for complete search history.

(56) References Cited

U.S. PATENT DOCUMENTS

| | | |
|---|---|---|
| 5,297,031 A | 3/1994 | Gutterman et al. |
| 5,873,071 A | 2/1999 | Ferstenberg et al. |
| 6,421,653 B1 | 7/2002 | May |
| 6,556,976 B1 * | 4/2003 | Callen ............................ 705/37 |
| 6,985,883 B1 | 1/2006 | Togher et al. |

(Continued)

FOREIGN PATENT DOCUMENTS

| | | |
|---|---|---|
| JP | 2002-183446 | 6/2002 |
| JP | 2004-234343 | 8/2004 |

(Continued)

OTHER PUBLICATIONS

PCT International Preliminary Report on Patentability, PCT/IB/373, dated Aug. 16, 2011, for corresponding International Application No. PCT/JP2009/071565.

(Continued)

*Primary Examiner* — Tien Nguyen
(74) *Attorney, Agent, or Firm* — Staas & Halsey LLP

(57) ABSTRACT

A transaction management device of executing plural if-done-orders in parallel. An order information generation unit of the device generates plural order information groups each including a first order for placing one of a buy or sell orders at a first order price, a second order for placing the other of these orders at a second order price, and a stop loss order for placing the other of these orders at a stop loss order price. This unit acquires the upper limit price for transactions, the lower limit price for transactions, and the number of simultaneously generated order information groups, and calculates the first and second order prices in such a manner that the price difference between the first orders is constant, the price difference between the second orders is constant, and the price difference between the first and the second orders belonging to the same group is constant.

12 Claims, 12 Drawing Sheets

U.S. PATENT DOCUMENTS

| | | | |
|---|---|---|---|
| 7,010,504 B2 * | 3/2006 | Ishikawa et al. | 705/26.3 |
| 7,130,823 B1 | 10/2006 | Rayner et al. | |
| 7,340,430 B2 | 3/2008 | Mulinder et al. | |
| 7,374,614 B2 * | 5/2008 | Ura et al. | 117/30 |
| 7,428,508 B2 | 9/2008 | Glinberg et al. | |
| 7,529,704 B1 | 5/2009 | Breslow et al. | |
| 7,571,136 B2 | 8/2009 | May | |
| 7,945,506 B2 * | 5/2011 | Demirjian | 705/37 |
| 8,055,567 B2 | 11/2011 | Glinberg et al. | |
| 8,073,754 B2 | 12/2011 | Glinberg et al. | |
| 8,073,764 B2 * | 12/2011 | Glinberg et al. | 705/37 |
| 2003/0126069 A1 * | 7/2003 | Cha | 705/37 |
| 2004/0088242 A1 * | 5/2004 | Ascher et al. | 705/37 |
| 2004/0249744 A1 * | 12/2004 | Ishikawa et al. | 705/37 |
| 2005/0203840 A1 | 9/2005 | Robles | |
| 2006/0069639 A1 | 3/2006 | Kalt | |
| 2006/0080215 A1 | 4/2006 | Warsaw et al. | |
| 2006/0106707 A1 | 5/2006 | Shetty et al. | |
| 2007/0061233 A1 | 3/2007 | Jovanovic et al. | |
| 2007/0061241 A1 | 3/2007 | Jovanovic et al. | |
| 2008/0288390 A1 | 11/2008 | Maynard | |
| 2010/0306133 A1 | 12/2010 | Johnston et al. | |
| 2011/0145134 A1 | 6/2011 | Bandman et al. | |
| 2011/0161221 A1 | 6/2011 | Yamamoto et al. | |
| 2012/0030090 A1 | 2/2012 | Johnston et al. | |
| 2012/0041896 A1 | 2/2012 | Johnston et al. | |

FOREIGN PATENT DOCUMENTS

| | | |
|---|---|---|
| JP | 2006-99787 | 4/2006 |
| JP | 2008-9562 | 1/2008 |
| JP | 2008-40689 | 2/2008 |
| JP | 2008-130002 | 6/2008 |
| JP | 2009-151434 | 7/2009 |

OTHER PUBLICATIONS

PCT Written Opinion of the International Searching Authority, PCT/ISA/237, for corresponding International Application No. PCT/JP2009/071565.

International Search Report mailed Feb. 2, 2010 for International Application No. PCT/JP2009/071565.

Japanese Office Action issued May 8, 2012 in corresponding Japanese Patent Application No. 2010-544150 (4 pages).

Kabushiki Kaisha Mane Sukuwea Japan, "iFX Style Sosa Guide $2^{nd}$ Edition", Feb. 28, 2007, (Internet Archive go Hozon shita Hi wa, Feb. 24, 2007, pp. 32-47. (19 pages) (6 pages English translation).

International Search Report mailed Sep. 29, 2009 in related PCT Application No. PCT/JP2009/064926 (2 pages) (2 pages English translation).

PCT International Preliminary Report on Patentability PCT/IB/373, issued Apr. 12, 2011, for related PCT application PCT/JP2009/64926 (2 pages).

Japanese and English Translation of Written Opinion of the International Searching Authority, PCT/ISA/237, issued Sep. 29, 2009 for related PCT application PCT/JP2009/64926 (5 pages) (6 pages English Translation).

US Office Action issue Feb. 24, 2012 in related U.S. Appl. No. 12/810,077 (8 pages).

US Notice of Allowance issued Jun. 15, 2012 in related U.S. Appl. No. 12/810,077 (14 pages).

U.S. Appl. No. 12/810,077, filed Jun. 22, 2010, Yamamoto, Hisatoshi, Money Square Japan Inc.

Japanese Office Action issued May 8, 2012 in corresponding Japanese Patent Application No. 2010-544150 (4 pages) (English Translation, 4 pages).

* cited by examiner

FIG.2

FIELD DEFINITION — 181a

| No | FIELD NAME | TYPE | RECORD LENGTH | NOT NULL | DEFAULT VALUE | NOTE | |
|---|---|---|---|---|---|---|---|
| 1 | ord_seq | int8 | 8 | NOT NULL | | ORDER NUMBER | |
| 2 | cust_seq | int8 | 8 | NOT NULL | | CUSTOMER NUMBER | 181b |
| 3 | style_id | int4 | 4 | NOT NULL | | PRODUCT NAME | 181c |
| 4 | ccy_pair_id | int4 | 4 | NOT NULL | | CURRENCY PAIR ID | 181d |
| 5 | ord_amnt | numeric | 6,553,565,531 | NOT NULL | | ORDER AMOUNT | 181e |
| 6 | ord_time | timestamp | | NOT NULL | | ORDED TIME | 181f |
| 7 | buy_sell_id | int4 | 4 | NOT NULL | | TRADE | 181g |
| 8 | ord_rate | numeric | 6,553,565,531 | NOT NULL | | ORDER PRICE | 181h |
| 9 | limit_time | timestamp | | NOT NULL | | TIME LIMIT OF ORDER | 181i |
| 10 | ord_cond | int4 | 4 | NOT NULL | 0 | TYPE OF ORDER | 181j |
| 11 | new_close | int4 | 4 | NOT NULL | | NEW/SETTLEMENT | 181k |
| 12 | trap_seq | int4 | 4 | NOT NULL | | TRAP ORDER | 181m |
| 13 | repeat_flag | int4 | 4 | NOT NULL | | REPEAT ORDER | 181n |

FIG.4

(a) PRESENT PRICE = 107.00 Yen/Dollar

| CURRENCY PAIR | U S D / J P Y | |
|---|---|---|
| BUY/SELL | BUY | |
| ORDER TYPE | XX TRAP TRADE | |
| UPPER LIMIT PRICE (DESIGNATED) | 112.00 | Yen |
| LOWER LIMIT PRICE (DESIGNATED) | 103.00 | Yen |
| TRAP UP-AND-DOWN RANGE (CALCULATED) | 9.00 | Yen |
| iFX Style (DESIGNATED) | pro | |
| ORDER AMOUNT (DESIGNATED) | 10 | × 10,000 Yen (CURRENCY) |
| NUMBER OF TRAP (DESIGNATED) | 10 | |
| TRAP PRICE RANGE (CALCULATED) | 0.90 | Yen |
| DESIGNATED PROFIT AMOUNT (DESIGNATED) | 5.0 | × 10,000 Yen |
| STOP LOSS PRICE (DESIGNATED) | 102.00 | |
| REPEAT IFD (DESIGNATED) | DESIGNATED | |
| EXPIRATION DATE | INDEFINITE PERIOD | |

- 401
- 402
- 403
- 404
- 405
- 412
- 406
- 407
- 413
- 408
- 409
- 410
- 411

[ SELECT ] — 414

(b) TRAP-REPEAT-IF-DONE INPUT SCREEN (CONCEPTUAL)

■ USD/JPY

BUYING TRAP TRADE ®

| | |
|---|---|
| START PRICE | 107.00 |
| iFx Style | pro |
| ORDER AMOUNT | 10 × TEN THOUSAND YEN (CURRENCY) |
| TRAP PRICE RANGE | 0.90 YEN |
| TRAP NUMBER | 10 |
| PROFIT AMOUNT DESIGNATION | 5.0 × TEN THOUSAND YEN |
| STOP LOSS PRICE | 102.00 |
| REPEAT IFD | DESIGNATED |
| EXPIRATION DATE | INDEFINITE PERIOD |

[ ORDER ] [ RETURN ]  — 51

NECESSARY AMOUNT OF MARGIN MONEY 3,152,100 YEN

ATTENTION: Repeat-IFD (RIFD) repeats orders until it is cancelled, and are cancelled when the necessary margin money lacks.

50

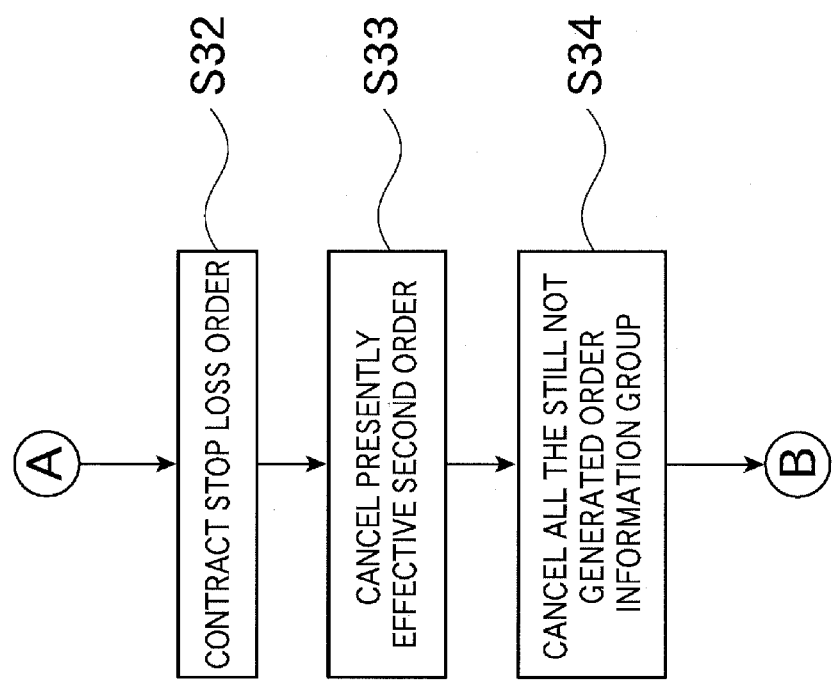

TRANSACTION MANAGEMENT DEVICE AND READABLE STORAGE MEDIUM

This application is a National Stage application under 35 USC 371 of International Application PCT/JP2009/071565, filed December 25, 2009, and which claims priority to Japanese Patent Application No. 2008-332601, filed Dec. 26, 2008, and which are incorporated herein by reference in their entireties.

FIELD OF THE INVENTION

The present invention relates to an art for performing the management and the support of the transaction. The present invention can be applied to a device for managing and supporting the transaction of the foreign exchange or other kinds of the financial products, for example.

BACKGROUND ART

The market order and the limit order are known as transaction methods for the financial product, for example, the foreign exchange. The market order means the order form in which the dealer performs the transaction by the price at the time the customer executes an order. The limit order means the order form in which the customer designates the trade price in advance and the dealer performs the transaction when the market price is equal to the designated trade price. In other words, the dealer who receives the limit order buys the corresponding financial product when the price of it falls to the designated price or sells the corresponding financial product when the price of it rises to the designated price. The invention for performing the limit orders of the financial products using a computer is previously known (described in the patent document 1, for example).

PRIOR ART DOCUMENT

Patent Document
Patent Document 1: JP2006-99787A

SUMMARY OF THE INVENTION

Problems to be Solved by the Invention

However, the prices of the financial products fluctuate irregularly at any time, and so it is substantially impossible to project them exactly. For example, when performing the limit order, there is a case that the price of the financial product falls near to the price designated in advance but turn to rise without reaching the designated price. In reverse, there is a case that the price of the financial product rises near to the price designated in advance but turn to fall without reaching the designated price. Moreover, there is a case that the price of the financial product falls and becomes lower than the price designated in advance. In reverse, there is a case that the price of the financial product rises and becomes higher than the price designated in advance. In these cases, there is a possibility that the customer will suffer from substantial loss. However, the invention disclosed in the above described patent document 1 cannot avoid such a loss.

In many cases, the if-done-orders are performed as the limit orders of the financial products. The if-done-order means the order form in which two transactions being provided with different positions are ordered at the same time. When the if-done-order is executed, firstly the trading in connection with the order of the higher position (corresponding to one of 'buy' and 'sell', hereinafter called 'first order') is done, then, the order of the lower position (corresponding to the other of 'buy' and 'sell', hereinafter called 'second order') is automatically set to be effective. However, the invention disclosed in the above described patent document 1 cannot manage the limit order of the if-done-order. In the present application, the 'effectiveness' of the order means the state in which the processing based on the order is in execution, and 'ineffectiveness' of the order means the state in which the processing based on the order is not in execution.

There is a case that one customer executes plural if-done-orders (i.e. plural pairs of the first and second orders) in connection with the same financial product. However, in the invention of the patent document 1, the customer needs to execute these if-done-orders individually by different operations, so the procedures of the order are complex.

The first purpose of the present invention is to provide an art for executing plural if-done-orders in parallel with simple operations. In addition, the second purpose of the present invention is to provide an art for stopping the if-done-orders automatically in response to the situation of market price. By achieving these purposes, the convenience of the system user can increase and risk of the system user can decrease.

Means to Solve the Problem

An embodiment of the invention comprises an order receiving unit that receives a trade order application information from a client terminal; an order information generation unit that generates a plural order information groups, each of which contains one first order for executing one of buying or selling at a first order price, one second order for executing the other of buying or selling at a second order price and one stop loss order for executing the other of buying or selling at a stop loss order price, by each trade order application information received by the order receiving unit and sets the first order price; a memory unit that stores the order information groups generated by the order information generation unit, and a contract information generation unit that sets the first order to be effective, the second order to be ineffective and the stop loss order to be ineffective when the transaction processing corresponding to one of order information groups starts, wherein; the order information generation unit performs processing for, acquiring an upper limit price of a transaction, a lower limit price of the transaction and the number of the order information groups generated together, computing the first order price and the second order price using the acquired prices and the acquired number so that differences between the first order prices are the same, differences between the second order prices are the same and differences between the first and the second order prices belonging to the same order information group are the same, storing the computed first and second order prices to the memory unit.

According to an embodiment of the invention, in addition to the subject matters of claim 1, the highest price among the second order prices is equal to or the lower than the upper limit price, and the lowest price among the second order prices is equal to or higher than the lower limit price.

According to an embodiment of the invention, in addition to the subject matters of claim 1, the highest price among the first order prices is equal to or the lower than the upper limit price, and the lowest price among the first order prices is equal to or higher than the lower limit price.

According to an embodiment of the invention, in addition to the subject matters of claim 1, the highest price among the second order prices is equal to or the lower than the upper limit price, and the lowest price among the second order prices is equal to or higher than the lower limit price.

According to an embodiment of the invention, in addition to the subject matters of claim 1, all of the stop loss order prices are the same.

According to an embodiment of the invention, in addition to the subject matters of claim 1, the contract information generation unit sets the second order and the stop loss order corresponding to the contracted first order to be effective, when one of the first order is contracted.

According to an embodiment of the invention, in addition to the subject matters of claim 1, the contract information generation unit newly generates next order information group corresponding to the order information group of which the second order is contracted, after the second order is contracted.

According to an embodiment of the invention, in addition to the subject matters of claim 1, the order information generation unit sets the number of traded products of each order information groups generated based on the same trade order application information the same.

According to an embodiment of the invention, in addition to the subject matters of claim 1, the contract information generation unit cancels all of the subsequent generations of order information groups corresponding to the order information group of which the stop loss order is contracted, after the stop loss order is contracted.

According to an embodiment of the invention, in addition to the subject matters of claim 1, the contract information generation unit extracts the order information group containing the order information corresponding to the order to which the cancellation is requested and cancels all of the order information still not contracted contained in the extracted order information group, when a cancellation to the order information group previously generated is requested.

According to an embodiment of the invention, in addition to the subject matters of claim 1, the contract information generation unit contracts the first or second order when the slippage occurs.

According to an embodiment of the invention, in addition to the subject matters of claim 1, each of the first orders and/or each of the second orders has attribute information containing a currency pair information, a trade direction information, an order price information or a repeat information.

According to an embodiment of the invention, in addition to the subject matters of claim 1, the financial product is a foreign exchange.

An embodiment of the invention comprises code segments of executing; an order receiving step that receives a trade order application information from a client terminal; an order information generation step that generates a plural order information groups, each of which contains one first order for executing one of buying or selling at a first order price, one second order for executing the other of buying or selling at a second order price and one stop loss order for executing the other of buying or selling at a stop loss order price, by each trade order application information received by the order receiving step and sets the first order price; a memory step that stores the order information groups generated by the order information generation unit, and a contract information generation step that sets the first order to be effective, the second order to be ineffective and the stop loss order to be ineffective when the transaction processing corresponding to one of order information groups starts, wherein the order information generation step contains, a first step of acquiring an upper limit price of a transaction, a lower limit price of the transaction and the number of the order information groups generated together; a second step of computing the first order price and the second order price using the acquired prices and the acquired number so that differences between the first order prices are the same, differences between the second order prices are the same and differences between the first and the second order prices belonging to the same order information group are the same; a third step of storing the computed first and second order prices to the memory unit.

Effect of the Present Invention

An embodiment of the invention sets each of the first order price and the second order price so that differences between the first order prices are the same, differences between the second order prices are the same and differences between the first and the second order prices belonging to the same order information group are the same. Therefore, plural if-done-orders can be executed in parallel with simple operations.

An embodiment of the invention automatically set the first and second order prices using the upper limit price and the lower limit price. Therefore, the settings of the if-done-orders can be executed with simple operations.

An embodiment of the invention sets the stop loss order price. Therefore, a risk of the customer can be avoided automatically.

An embodiment of the invention automatically sets the second order and the stop loss order to be effective when the first order is contracted. Therefore, operations of the customer are simple.

An embodiment of the invention newly generates next order information group corresponding to the order information group of which the second order is contracted, after the second order is contracted. Therefore, the repeat-if-done-order can be executed automatically.

An embodiment of the invention sets the number of traded products of each order information groups generated based on the same trade order application information the same. Therefore, there is a possibility that the customer can make a stable profit even when the market price moves.

An embodiment of the invention executes the cancellation processing automatically. Therefore, a risk of the customer can be avoided automatically if there is a big price movement in the market.

An embodiment of the invention contracts the first and second orders even when the slippage occurs. Therefore, profits of the customer can be easy to be made.

Each of the first orders and/or each of the second orders according to an embodiment of the invention has attribute information containing a currency pair information, a trade direction information, an order price information or a repeat information. Therefore, the processing of the transaction management device can be simplified.

An embodiment of the invention can apply the present invention to a foreign exchange transaction.

An embodiment of the invention can construct the device of the present invention by a computer.

BRIEF DESCRIPTION OF THE DRAWINGS

FIG. 2 is a diagram showing field definitions of the order table stored in the transaction management device shown in FIG. 1.

FIG. 4 shows a conceptual diagram (a) showing an example of the second input screen displayed by the display unit of the client terminal and a conceptual diagram (b) showing the confirmation screen displayed by the display unit of the client terminal.

FIG. 6B is a flowchart showing the processing of the transaction management system according to the present embodiment.

DESCRIPTION OF THE PREFERRED EMBODIMENTS

Hereinafter, an embodiment of the present invention is described.

The First Embodiment of the Present Invention

An embodiment of the present invention is described with reference to the drawings, hereinafter.

Figure 1:
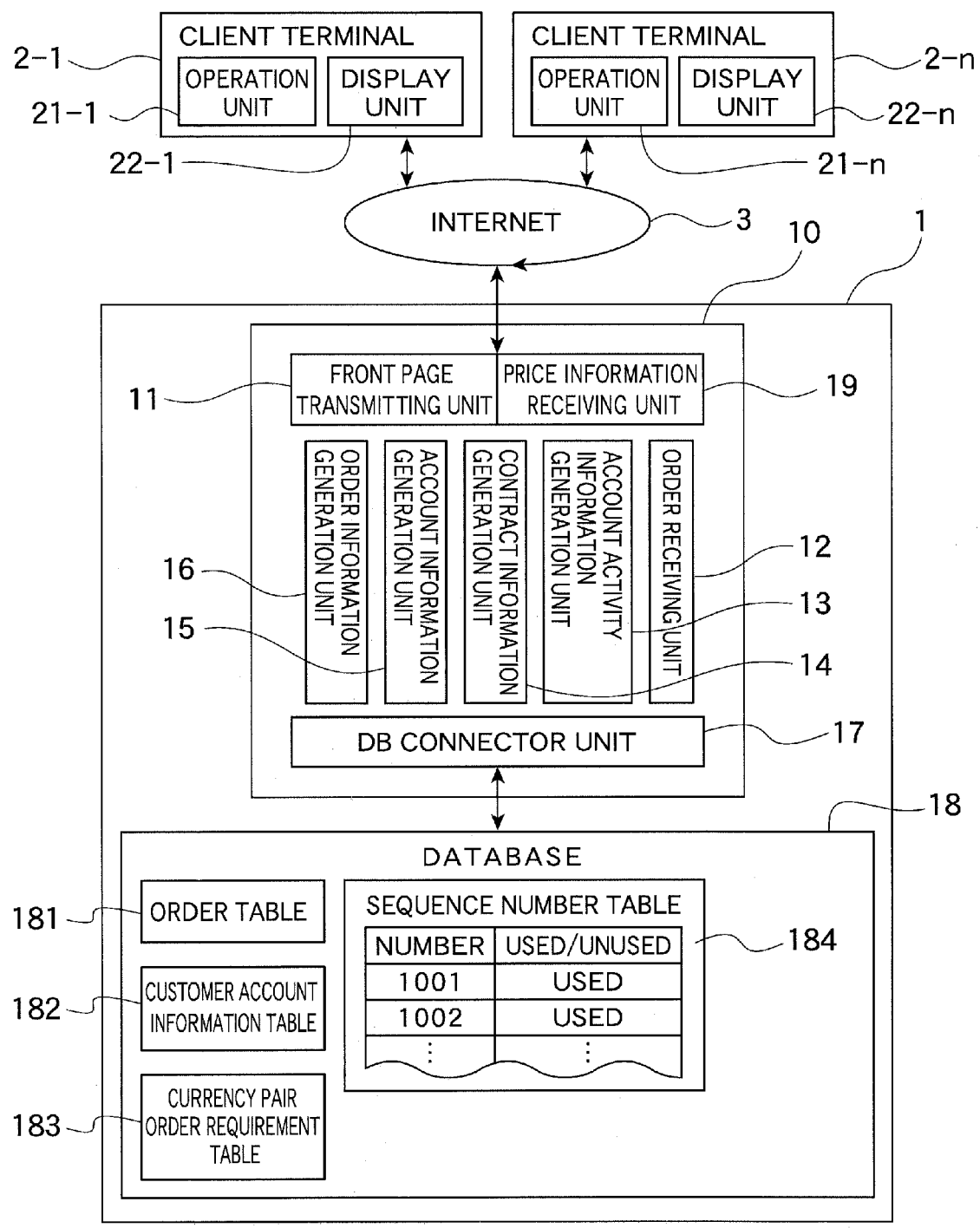
FIG. 1 is a block diagram conceptually showing the structure of the transaction management system according to the present embodiment.

FIG. 1 is a block diagram conceptually showing the structure of the financial product transaction management system according to the present embodiment. As shown in FIG. 1, the financial product transaction management system 1A comprises a financial product transaction management device 1 and plural client terminals 2-1 to 2-$n$ (the number of the client terminals is defined as 'n' in the present embodiment). The financial product transaction management device 1 and the client terminals 2-1 to 2-$n$ can communicate each other via the internet 3 as a WAN (Wide Area Network). The financial product transaction management system 1A according to the present embodiment treats the foreign exchange as the financial product.

The financial product transaction management device 1 is the server computer administrated and managed by the handler of the financial product. The management device 1 comprises a function of a web server and a function of a database storing large quantities of data.

The client terminals 2-1 to 2-$n$ are owned and used by the individuals or corporations who execute the trade of the financial product. The terminals 2-1 to 2-$n$ are the communication terminals having the data communication functions. Personal computers, mobile phones and so on can be used as the terminals 2-1 to 2-$n$.

The client terminals 2-1 to 2-$n$ comprise the operation units 21-1 to 21-$n$ and the display units 22-1 to 22-$n$. The operation units 21-1 to 21-$n$ are, for example, computer mouse, keyboards etc. and used for inputting various kinds of instructions by the users. The display units 22-1 to 22-$n$ display various kinds of instructions input from the operation units 21-1 to 21-$n$ and various kinds of pictures. Each structure of the client terminals 2-1 to 2-$n$, each structure of the operation units 21-1 to 21-$n$ and each structure of the display units 22-1 to 22-$n$ are the same. Therefore, they are described as the client terminal 2, the operation unit 21 and the display unit 22 hereinafter, except for the case that the distinction is necessary.

While not shown in FIG. 1, the financial product transaction management device 1 comprises at least one CPU (Central Processing Unit), a RAM (Random Access Memory) used as the working area of the CPU, a ROM (Read Only Memory) storing the boot program etc., the auxiliary storage unit storing various kinds of programs and various kinds of data etc., a communication interface used for data communication and so on. The auxiliary storage unit is, for example, a hard disk storing an OS (Operation System) program, plural application programs, data of database and so on. The programs and the data stored in the hard disk realize various kinds of functions using the CPU and the hardware resources. However, these functions can be realized by only using a hardware.

As shown in FIG. 1, the financial product transaction management device 1 comprises a data processor 10 and a database 18. The data processor 10 realizes various functions using the above mentioned program and hardware resource. The database 18 stores various kinds of data which is processed by the data processor 10. The data processor 10 comprises a front page transmitting unit 11, an order receiving unit 12, an account activity information generation unit 13, a contract information generation unit 14, an account information generation unit 15, an order information generation unit 16, a database (DB) connector unit 17 and a price information receiving unit 19.

The order receiving unit 12 receives a trade order application information from the client terminal 2 and executes the process necessary for forming the orders of the financial products.

The account activity information generation unit 13 receives the request for deposit and withdrawal from the client terminal 2 and generates a list of deposit and withdrawal based on the request.

The order information generation unit 16 generates the information in connection with the formed order based on the information processed by the order receiving unit 12. The 'order' of the present embodiment contains the if-done-order in addition to the market order and the limit order.

In the present embodiment, the order information generation unit 16 generates the first order as a new limit order information, generates the second order as a settlement limit order information and generates the stop loss order as a settlement stop loss order information. By generating the first order as a new limit order information, the order method can be standardized. Consequently, the information processing of the financial product transaction management system 1A is simplified and so the structure of the system 1A is simplified. In addition, standardization of the order method simplifies the order procedure, thereby enhances the convenience of the customer. By generating the second order as a settlement limit order information, the profit given by the first order can be fixed by the second order. Consequently, the order procedure and the information processing of the financial product transaction management system 1A can be simplified. The stop loss order means a buying order at a higher price than the present rate or a selling order at a lower price than the present rate. In the case where the stop loss order is executed in advance, the buying or the selling can be executed automatically when the exchange rate moves suddenly, and so the loss can be suppressed to minimum. In the present embodiment, the stop loss order can be executed only when the stop loss order is necessary, that is, only when the settlement procedure for minimizing the loss of the customer is executed, because the present embodiment generates the stop loss order as a settlement stop loss order. Consequently, the overuse of the stop loss order is prevented and the information processing of the financial product transaction management system 1A is simplified.

The contract information generation unit 14 executes the contract processing corresponding to the order generated by the order information generation unit 16 and the processing of transmitting the information corresponding to the completed contract processing to the client terminal 2 of the customer. In the present embodiment, the 'contract' means that the transaction corresponding to the customer's order goes through. And the 'contract processing' means the procedure and the processing for going through the transaction corresponding to the customer's order. As described below, the present embodiment executes foreign exchange trading when the contract has gone through. Then, based on a command from the contract information generation unit 14, the account information generation unit 15 changes the margin money information (described below) depending on the trading amount, moreover, the account activity information generation unit 13 writes the condition of the account activities to the list of account activities. Additionally, the contract information generation unit 14 makes the display unit 22 of the client terminal 2 to display the character information etc. indicating the going through of the contract, and processes the account activities of the bank account of the client terminal based on the trading price.

The account information generation unit 15 has a function of generating a deposit balance information (i.e. an information for specifying the account, balance and so on) and a function of managing the generated deposit balance information as a margin money information (i.e. an information to support that the contract of the order can be realized). Incidentally, the margin money information is periodically compared with the actual margin money of the customer. The information corresponding to the actual margin money of the customer is provided by the bank or other finance institution.

The database connector unit 17 executes data conversions between the data format of the data processor 10 and the data format of the database 18 (for example, bi-directional conversions between the logical data structure and the physical data structure) and executes the necessary processing for communication between the data processor 10 and the database 18.

The database 18 stores the data used by the financial product transaction management device 1. In the present embodiment, a relational database is used as the database 18. However, other kinds of database (e.g. an object database) can be used if suitable for storing large quantities of data and rewriting of the data. The database 18 stores an order table 181, a customer account information table 182 which defines the information such as the banking facility of the bank account of the customer, the name of the bank account, bank balance etc., a currency pair order requirement table 183 which defines the information corresponding to the combination of the traded currencies etc., and a sequence number table 184.

The sequence number table 184 stores sequence numbers used for distinguishing the order information (described below). The detail of the order table 181 is described below.

The front page transmitting unit 11 generates the display data provided by the display unit 22 of the client terminal 2 and transmits the generated display data to the client terminal 2.

The price information receiving unit 19 acquires the information concerning the price of the financial product processed by the financial product transaction management device 1. Moreover, the price information receiving unit 19 executes the processing necessary for making the data processor 10 to use the acquired information. In the present embodiment, the price information receiving unit 19 acquires information concerning the price of the foreign exchange, stores the information in it and manages the stored information.

Incidentally, not shown in FIG. 1, the financial product transaction management device 1 comprises a timer that acquires and manages date and hour information, and a deadline management unit that manages expiration date of the first order, the second order and the stop loss order (described below) based on the date and hour information acquired from the timer.

FIG. 2 shows the field definitions of the order table 181. As shown in FIG. 2, the table 181 has plural columns. In FIG. 2, the 'field name' defines the name of the field, the 'type' defines the type of the data, for example, character, numerical value, date and hour, etc., the 'record length' defines the bit length or other kind of the data length, the 'NOT NULL' defines whether a blank space is admitted, the 'default value' defines whether the default value exists and the 'note' defines the name of data.

The financial product transaction management device 1 of the present embodiment can execute the repeat-if-done-order. The repeat-if-done-order means repetition of plural if-done-orders, each of which corresponds to the same financial product, based on the predetermined first and second order prices. Moreover, the financial product transaction management device 1 can collaterally execute plural kinds of repeat-if-done-orders based on a single trade order application (i.e. single trade order application information). In the present application, such order is called trap-repeat-if-done-order. The first order price and the second order price are different by each repeat-if-done-order. The trap-repeat-if-done-order is a kind of the trap trade. The trap trade means to simultaneously reserve the plural transactions in which the types and numbers of the financial products are the same, but transaction price of which are different. As described below, the present embodiment realizes the trap-repeat-if-done-order by generating plural order information group having prices different from each other by the contract information generation unit 14 and repeating each of the if-done-orders contained in the order information groups until the expiration date.

Next, the procedures of the financial product transaction management system 1A for executing the trap-repeat-if-done-order is described.

Figure 3:
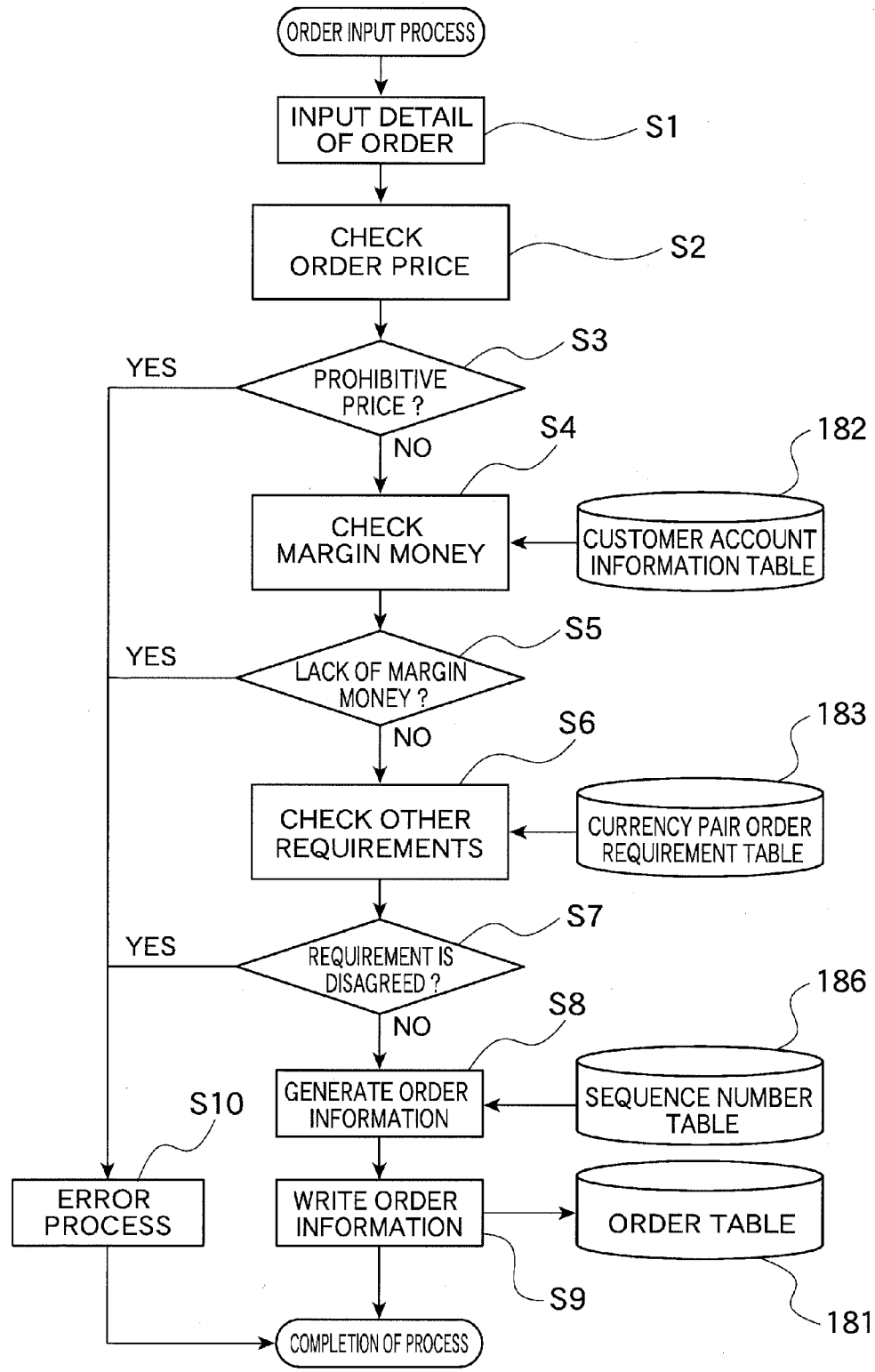
FIG. 3 is a flowchart showing the procedures when the transaction management device shown in FIG. 1 executes the trap-repeat-if-done-order.

FIG. 3 is a flowchart showing the procedures when the transaction management device 1 executes the trap-repeat-if-done-order. Hereinafter, the procedures for the ordering is described with referencing FIG. 3.

When using the financial product transaction management system 1A, the customer accesses to the financial product transaction management device 1 using the client terminal 2. The front page transmitting unit 11 of the financial product transaction management device 1 makes the display unit 22 of the accessing client terminal 2 to display the input screen 40 shown in the diagram (a) of FIG. 4. In the input screen 40, the desired trade currency pair selection button 401 is a button for making the screen to display the currency pair capable to be traded. The trade type selection button 402 is a button for making the screen to display the type of trade corresponding to the limit order contracted firstly. The order type selection button 403 is a button for making the screen to display types of orders capable to be selected. The upper limit price input field 404 inputs the upper limit price that is a reference price used for setting the highest price range. The lower limit price input field 405 inputs the lower limit price that is a reference price used for setting the lowest price range. The order price input field 406 inputs the amount of currency traded by a contract of the limit order and the stop loss order (Japanese Yen in FIG. 4). The trap number selection field 407 is the field for selecting the number of the traps, that is, the number of the position pairs. In the present application, the position pair means the pair of a buying order's position (that is, held amount of the foreign currency) and a selling order's position for selling the financial product bought by the above mentioned buying order. The profit amount input field 408 is the field for inputting the user's desired amount of profit (Japanese Yen) gained by contracting the buying order and the selling order corresponding to a single position pair. The stop loss order price input field 409 is the field for inputting the contract price of the stop loss order, that is, 'stop loss order information'. The repeat-if-done-order selection field 410 is the field for selecting whether the repeat-if-done-order described above is executed. The expiration date selection button 411 is the field for selecting the expiration date of each of the limit orders and the stop loss orders.

In addition, the input screen 40 displays the trap up-and-down range information 412 calculated by the financial product transaction management device 1 based on the data input to each of input fields and selection buttons 401-411, and displays the trap price range information 413 as the 'price difference information'. The trap up-and-down range information 412 is the amount calculated by subtracting the lower limit price input to the lower limit input field 405 from the upper limit price input to the upper limit price input field 404. The trap price range information 413 is the value calculated by dividing the trap up-and-down range information 412 by the value of the number of the traps input to the trap number selection field 407. The trap price range information 413 is used as the 'price difference information', that is, the price difference between the adjacent price ranges.

The customer selects and inputs the order content data displayed on the input screen 40 by operating the operation unit 21 (see step S1 of FIG. 3). The diagram (a) of FIG. 4 shows the condition in which the USD/JPY (i.e. trading the US dollar using Japanese Yen) is selected using the trade currency pair selection button 401, 'buying' is selected using the trade type selection button 402, the 'trap trade order' is selected using the order type selection button 403, '112.00' Yen per dollar is input to the upper limit price input field 404, '103.00' Yen per dollar is input to the lower limit price input field 405, '10'×10,000 Yen is input to the order price input field 406, '10' is input to the trap number selection field 407, '5.0'×10,000 Yen is input to the profit amount designation field 408, '102.00' Yen per dollar is input to the stop loss order price input field 409, designation of the repeat-if-done-order is selected using the repeat-if-done-order selection field 410, 'indefinite period' is selected using the expiration date selection button 411, '9.00' Yen (i.e. the amount calculated by subtracting the lower limit price 103.00 Yen from the upper limit price 112.00 Yen) is input as the trap up-and-down range information 412 and '0.90' Yen (i.e. the value calculated by dividing the trap up-and-down range 9.00 Yen by the value of the number of the traps 10) as the trap price range information 413.

When the selection button 414 is clicked in such condition, the trade order application information, which contains the data specified by the input fields and the selection fields 401-411 of the input screen 40 in addition to the information 412 and 413, is supplied to a financial product transaction management device 1. The input order receiving unit 12 of the financial product transaction management device 1 confirms the input trade order application information. That is, the input order receiving unit 12 confirms the expiration date selected using the expiration date selection button 411 and the type of the order selected using the order type selection button 403, moreover checks each of the order prices (see step S2 of FIG. 3). Concretely, the input order receiving unit 12 checks whether the price of the trap up-and-down range information 412 is equal to or more than the value calculated by multiplying the value of the trap price range information 413 by the value of the trap number selection field 407, and whether the price of the stop loss order price input field 409 is lower than the price of the lower limit price input field 405, and so on.

Incidentally, during the process of steps S2 to S9, the display unit 22 of the client terminal 2 displays the third input screen (not shown in Figures) having an order cancellation button used for canceling the repeat-if-done-order, instead of the input screen 40.

Next, the input order receiving unit 12 decides the appropriateness of the result of the checking (see step S3 of FIG. 3). When the price is decided to be appropriate ('No' of the step S3), the account information generation unit 15 acquires the margin money information from the customer account information table 182.

The order input receiving unit 12 compares the acquired margin money information with the permitted order amount (see step S4 of FIG. 3), then, decides whether the amount of the margin money is equal to or more than the permitted order amount (see step S5 of FIG. 3).

Here, 'permitted order amount' means the amount necessary for ordering (it is the same throughout the whole present specification). In other words, the permitted order amount is the value obtained by multiplying the amount input to the order price input field 406 by the number of the order input to the trap number selection field 407. In the present invention, the permitted order amount is 100 (×10,000 Yen) which is calculated by 10 (×10,000 Yen)×10 (i.e. the number of the order), however, the permitted order amount can be the value calculated by multiplying the above described calculation result by the predetermined ratio (e.g. 100 (×10,000 Yen)× 0.1=10 (×10,000 Yen)), or can be the predetermined fixed price (e.g. flat price 10 (×10,000 Yen)) or can be decided using other method of determination.

The order information generation unit 16 generates the 'order information group' described below only when the amount of the margin money is equal to or more than the permitted order amount ('No' of step S5). As a result, the limit order based on the if-done-order can be received only when the customer can ensure payment.

When the margin money is equal to or more than the permitted order amount ('No' of step S5), the order input receiving unit 12 compares other order conditions (i.e. the conditions other than the order price) with a variety of references for receiving the if-done-order based on the data etc. recorded in the currency pair order requirement table 183 (see step S6 of FIG. 3). Then, the order input receiving unit 12 decides whether other conditions satisfy these references (see step S7 of FIG. 3).

When other conditions do not satisfy the references of the if-done-order ('Yes' of step S7), the order input receiving unit 12 deals with the input order as an error and rejects to receive the order (step S10).

If each of the conditions corresponding to the if-done-order is satisfied ('No' of step S7), the order condition is decided to satisfy every requirements necessary for the limit order corresponding to the if-done-order described above. In this case, the front page transmitting unit 11 makes the display unit 22 of the client terminal 2 to display the confirmation screen 50 shown in the diagram (b) of FIG. 4. The confirmation screen 50 lists the order conditions input and selected using the input screen 40 in series and displays the order button 51. The order button 51 is clicked by the user when the listed order conditions are decided to be all right.

When the customer clicks the order button 51 by operating the operation unit 21, the order information generation unit 16 of the financial product transaction management device 1 generates the order information based on the trade order application information input at step S1 (see step S8 of FIG. 3). Concretely, the order information generation unit 16 generates the order information by grouping the plural data, which are input according to the above mentioned procedures, by each order price and assigning the sequence number of the sequence number table 184 to each group (see step S8 of FIG. 3). Then, the information for distinguishing the used sequence number and the unused sequence number is added to the sequence number table 184. Plural order information are generated by executing single processing according to the Step S8. These order information corresponds to the financial product of the same type each other, however, the prices of the limit orders or the prices of the stop loss orders differ from each other. These order information constitutes single order information group.

The order information generation unit 16 records the generated order information group into the order table 181 (see step S9 of FIG. 3). The order information group is recorded into the order table based on the definitions of each field shown in FIG. 2. The 'ord_seq' field 181$b$ defines the sequence number assigned at the step S8. The 'cust_seq' field 181$c$ is the field for recording the customer number assigned to each customer. The 'style_id' field 181$d$ is the field for recording the name of the product. The 'ccy_pair_id' field 181$e$ is the field for recording the ID number assigned to each currency pair. The relationship between the ID number and the currency pair is recorded in the ID table (not shown in Figures) stored in the database. The 'ord_amnt' field 181$f$ is the field for recording the amount input to the order price input field 406. The 'buy_sell_id' field 181$g$ is the field for recording the distinction between the selling order and the buying order selected by the trade type selection button 402. The 'ord_rate' field 181$h$ is the field for recording the price of the order information which is decided based on the upper limit price input field 404, the lower limit price input field 405, the trap up-and-down range information 412 and the trap price range information 413. The 'limit_time' field 181$i$ is the field for recording the time limit of the order selected using the expiration date selection button 411. The 'ord_cond' field 181$j$ is the field for recording the type of the order selected using the order type selection button 403. The 'new_close' field 181$k$ is the field for recording the distinction between the new order and settlement order. The 'trap_seq' field 181$m$ is the field for recording the information whether the trap trade is selected using the order type selection button 403. The 'repeat_flag' field 181$n$ is the field for recording the information whether the if-done-order is repeated. Incidentally, while not shown in FIG. 2, the order table 181 is provided with the fields for recording the data input to the input screen 40, that is, the desired trade currency pair selection button 401, the trap number selection field 407, the profit amount designation field 408 and the stop loss order price input field 409. All of the data input to the input screen 40 are recorded into the order table 181 using these fields.

Furthermore, the order information generation unit 16 acquires the upper limit price input to the upper limit price input field 404 of the input screen 40 (112.00 Yen in the example of FIG. 4) and the lower limit price input to the lower limit price input field 405 (103.00 Yen in the example of FIG. 4), and record them into the order table 181. As described below, the contract information generation unit 14 sets the price ranges of all order information groups so that the recorded upper limit price and the recorded lower limit price will fall within the price range from the upper limit price up to the lower limit price.

Furthermore, the order information generation unit 16 acquires the information displayed on the input screen 40 as the trap price range information 413, and records it into the order table 181. As described below, the contract information generation unit 14 sets the price range of each order information group using the trap price range information 413 as the price interval between the order information.

In this way, the receiving processing for the limit order corresponding to the trap-repeat-if-done-order of the present embodiment is completed.

Figure 5A:
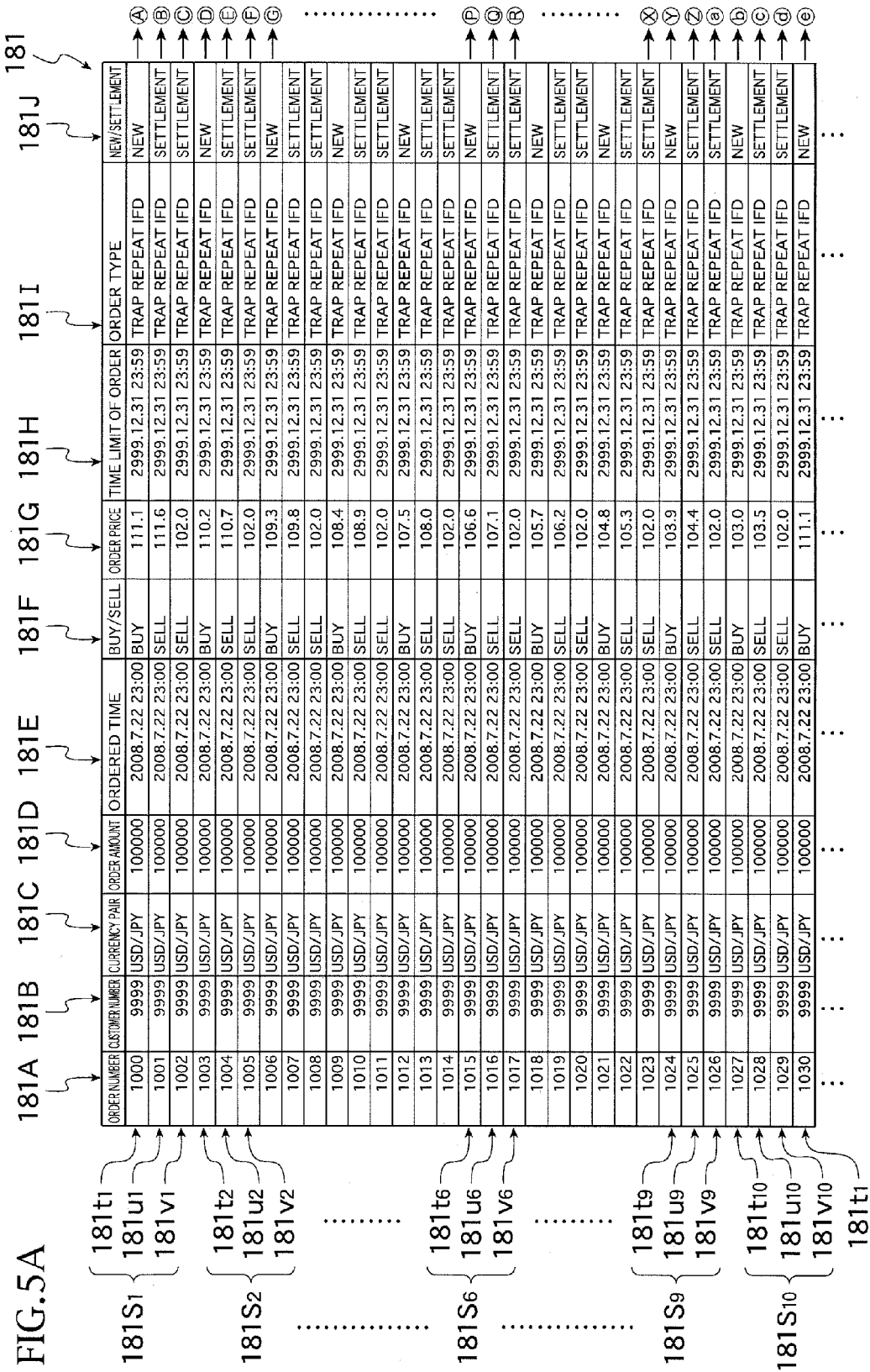
FIG. 5A is a table showing the order information groups generated by the transaction management system according to the present embodiment.
Figure 5B:
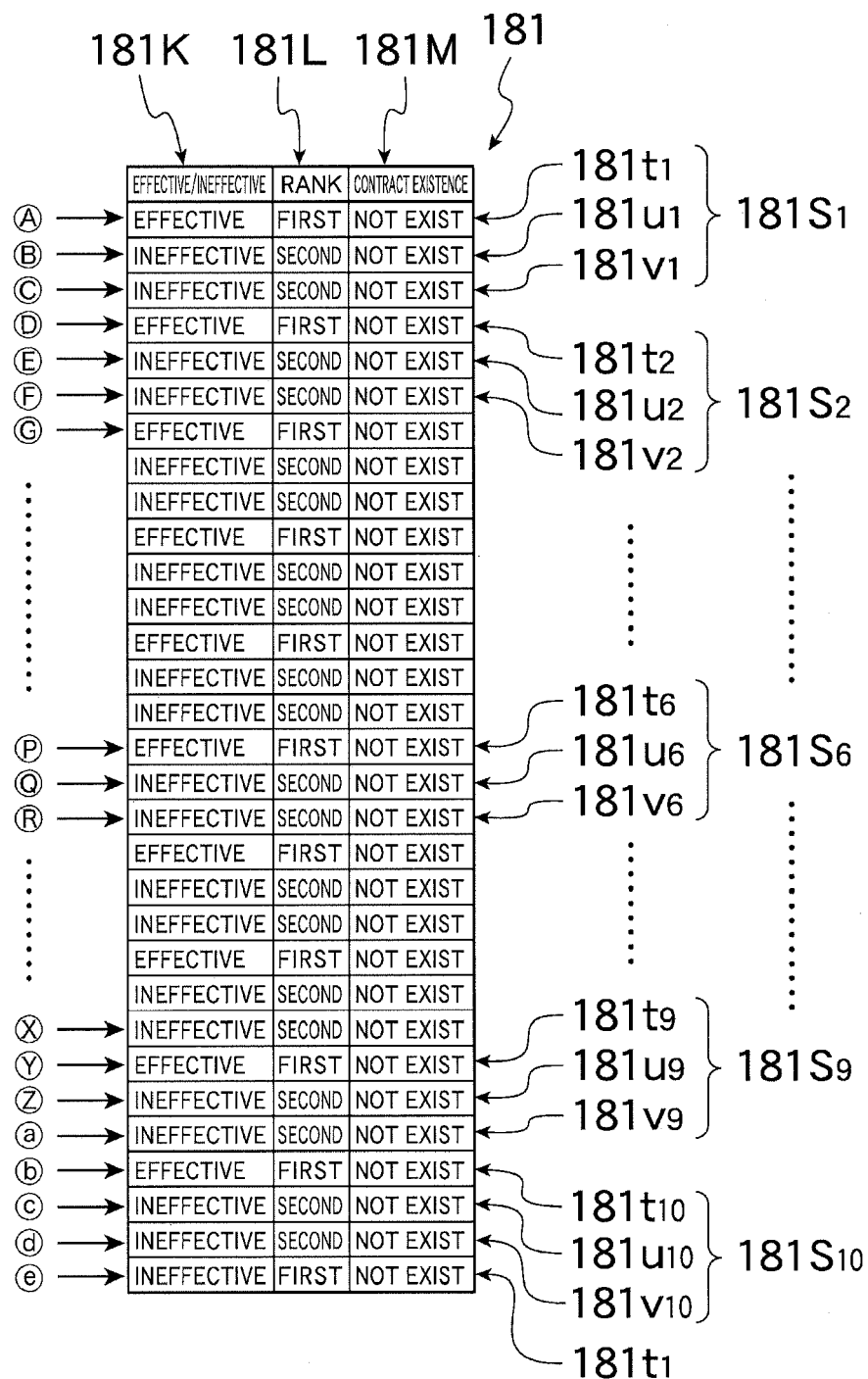
FIG. 5B is a table showing the order information groups generated by the transaction management system according to the present embodiment.

FIGS. 5A and 5B are the diagrams showing the order information groups generated by the order information generation unit 16 and recorded into the order table 181. Incidentally, the table shown in FIGS. 5A and 5B can be displayed on the display unit 22 of the client terminal 2 by the front page transmitting unit 11.

As shown in FIGS. 5A and 5B, the order information groups corresponding to plural position pairs are recorded in the order table 181. As described above, the number of the position pairs is equal to the input value of the trap number selection field 407. In the present embodiment, the number of the trap is set to '10'. Therefore, in the example of FIGS. 5A and 5B, ten kinds of the order information groups 181S1, 181S2, . . . , 181S10 are recorded in the order table 181.

One order information group 181Sk contains one first order 181$tk$, one second order 181$uk$ and one stop loss order 181$tk$ (k=1, 2, . . . , 10). The first order 181$tk$ is the buying order information for limit ordering or stop loss ordering of same financial products at the same price. The second order 181$uk$ is the selling order information for limit ordering of financial product corresponding to the first order 181$tk$ at another price. The stop loss order 181$uk$ is the information for stop loss ordering of financial product corresponding to these buying order information and selling order information at a different price from the prices of the buying order information and the selling order information. As shown in FIG. 5A, the types and the numbers of these order information groups are the same, but the order prices of them are different from each other.

The order information generation unit 16 acquires the information corresponding to the upper limit price (i.e. the price input to the upper limit price input field 404) and the lower limit price (i.e. the price input to the lower limit price input field 405) from the order table 181. Then, the order information generation unit 16 sets the prices of all of the first orders 181$t1$-181$t10$ and all of the second orders 181$u1$-181$u10$ to the prices within the price range from the lower limit price up to the upper limit price.

Concretely, among the first orders 181$t1$-181$t10$ and the second orders 181$u1$-181$u10$, the highest price is the price of the second order 181*u*1 in the first order information group 181S1, and the lowest price is the price of the first order 181*t*10 in the tenth order information group 181S10. Therefore, in the present embodiment, the second order 181*u*1 is set to be equal to or lower than 112.00 Yen per dollar, and the first order 181*t*10 is set to be equal to or higher than 103.00 Yen per dollar. However, the first orders 181*t*1-181*t*10 and the second orders 181*u*1-181*u*10 can be set so that only the first orders 181*t*1-181*t*10 are set to be the price within the above described price range, or only the second orders 181*u*1-181*u*10 are set to be the price within the above described price range. In other words, in the present embodiment, the highest set price needs not to be equal to the upper limit price and the lowest set price needs not to be equal to the lower limit price. In the case where the highest set price and the lowest set price are not equal to the upper limit price and the lower limit price, the difference between the upper limit price and the highest set price can be made to be equal to the difference between the lower limit price and the lowest set price. For example, in the case where the upper limit price is 112.00 Yen and the lower limit price is 103.00 Yen (see the input field 405, 406 and the display field 413), the highest price can be set to 111.55 Yen and the lowest price can be set to 103.45 Yen.

The order information generation unit 16 acquires the trap price range information (i.e. the value displayed as the trap price range information 413) from the order table 181. Then, the order information generation unit 16 sets the order prices 181G of all first orders 181*t*1-181*t*10 and all second orders 181*u*1-181*u*10 corresponding to all order information groups 181S1-181S10 using the lower limit price, that is 103.00 Yen per dollar, as the reference price. In this way, the price ranges of every order information groups 181S1, 181S2, . . . , 181S10 are set.

Concretely, when the order prices 181G are set, the order information generation unit 16 firstly sets the first order 181*t*10 of the tenth order information group 181S10 to the lower limit price, that is, 103.00 Yen per dollar. Next, the order information generation unit 16 executes the calculation of dividing the amount input to the profit amount input field 408 by the amount input to the order price input field 406 (i.e. '5.00×10,000'/'10×10,000'=0.5), and adding the result of such calculation to the lower limit price. The result of the addition, that is 103.50 Yen, is set to the price of the second order 181*u*10.

Next, the order information generation unit 16 sets the other prices 181G of the order 181*t*1-181*t*9 and 181*u*1-181*u*9 so that each intervals between the first orders 181*t*1-181*t*10 and each intervals between the second orders 181*u*1-181u10 become 0.9 Yen (i.e. trap price range).

For example, the order information generation unit 16 sets the first order 181*t*9 to the 103.9 Yen per dollar that is 0.90 Yen higher than the first order 181*t*10, and sets the second order 181*u*9 to 104.40 Yen per dollar, that is 0.90 Yen higher than the second order 181S10. Similarly, each of the differences between the first orders 181*t*9 and 181*t*8, between the first orders 181*t*8 and 181*t*7, . . . , and between the first orders 181*t*2 and 181*t*1 is set to 0.9 Yen, moreover, each of the differences between the second orders 181*u*9 and 181*u*8, between the second orders 181*u*8 and 181*u*7, . . . , and between the second orders 181*u*2 and 181U1 is set to 0.9 Yen.

Next, the order information generation unit 16 sets the order prices 181G of the stop loss orders 181*v*1, 181*v*2, . . . , 181*v*10, which belongs to the order information groups 181S1-181S10, to the price input to the stop loss order price input field 409 (i.e. 102.0 Yen per dollar in the present embodiment).

As shown in FIGS. 5A and 5B, the attribute information 181A, 181B, . . . , 181M are added to the first orders 181*t*1-181*t*10, the second orders 181*u*1-181*u*10 and the stop loss orders 181*v*1-181*v*10. Among these attribute information 181A-181M, the order number 181A is the serial number of the order. The customer number 181B is the number assigned to each customer. The currency pair information 181C is the information for distinguishing the combination of the currency to be traded (e.g. the combination of Japanese Yen and a foreign money). The order amount information 181D is the information indicating the held amount of the foreign currency corresponding to one order, that is, the price of the position. The order time information 181E is the information indicating the time of order placement. The trade direction information 181F is the flag information indicating the distinction between 'the buying order' and 'the selling order'. The order price information 181G is the information corresponding to the contract price. The order expiration date information 181H is the information indicating the expiration date of the corresponding order. The order type information 181I is the flag information for distinguishing the type of the order (e.g. the types such as 'the market order' the 'if-done-order' and 'the trap-repeat-if-done-order'), which works as 'repeat information'. The new/settlement information 181J is the flag information indicating the distinction between the new order and the settlement order. The effective/ineffective information 181K is the flag information indicating whether the corresponding limit order or stop loss order is effective (i.e. the order has been placed) or ineffective (i.e. the order has not been placed). The rank information 181L is the flag information for distinguishing the priority ranking of the order information (described below). The contract existence information 181M is the flag information for distinguishing whether the corresponding order has been contracted. The values of these attribute information 181A-181M are determined based on the information input from the input screen 40 and recorded into the order table 181 based on the above mentioned field definitions.

As shown in FIG. 5A, the new/settlement information 181J of the first orders 181*t*1-181*t*10 are set to 'new' and those of the second orders 181*u*1-181*u*10 and the stop loss orders 181*v*1-181*v*10 are set to 'settlement' at the initial setting.

As shown in FIG. 5B, the rank information 181L of the first orders 181*t*1-181*t*10 are set to the first rank (i.e. higher priority rank) and the rank information 181L of the second orders 181*u*1-181*u*10 and the stop loss orders 181*v*1-181*v*10 are set to the second rank (i.e. lower priority rank).

The effective/ineffective information 181K are set to be 'ineffective' that is the condition in which the orders have not been contracted yet, at the initial setting.

As described below, effectiveness/ineffectiveness of each order information changes in the process of trading, and the order information generation unit 16 rewrites the distinction of effectiveness/ineffectiveness of the order information in the order table 181. As a result, the data written in the order table 181 changes responding to the condition of the if-done-order trading, and so the affinity between the application of the present embodiment and other applications working on the financial product transaction management device 1 can become higher, additionally, the display unit 22 of the client terminal 2 can display the effectiveness/ineffectiveness of the order in real time.

The order input receiving unit 12 processes the input order as an error and the order is rejected (see step S10 of FIG. 3), in the case where the first desired price is decided to be unsuitable in the step S3 of FIG. 3 ('Yes' of the step S3) and where the amount of the margin money is lower than the permitted order amount in the step S5 ('Yes' of the step S5). In these cases, the order information groups 181S1-181S10 shown in FIGS. 5A and 5B are not generated, and a character information etc. for indicating the rejection of the order receiving is displayed on the display unit 22 of the client terminal 2.

After completing the order processing, the price information receiving management unit 19 of the financial product transaction management device 1 repeats to acquire the information related to the exchange rate periodically (e.g. at 1 minute intervals, 1 hour intervals or other fixed intervals). When the exchange rate become equal to the order price of any position, the contract information generation unit 14 contracts the order of corresponding position.

Figure 6A:
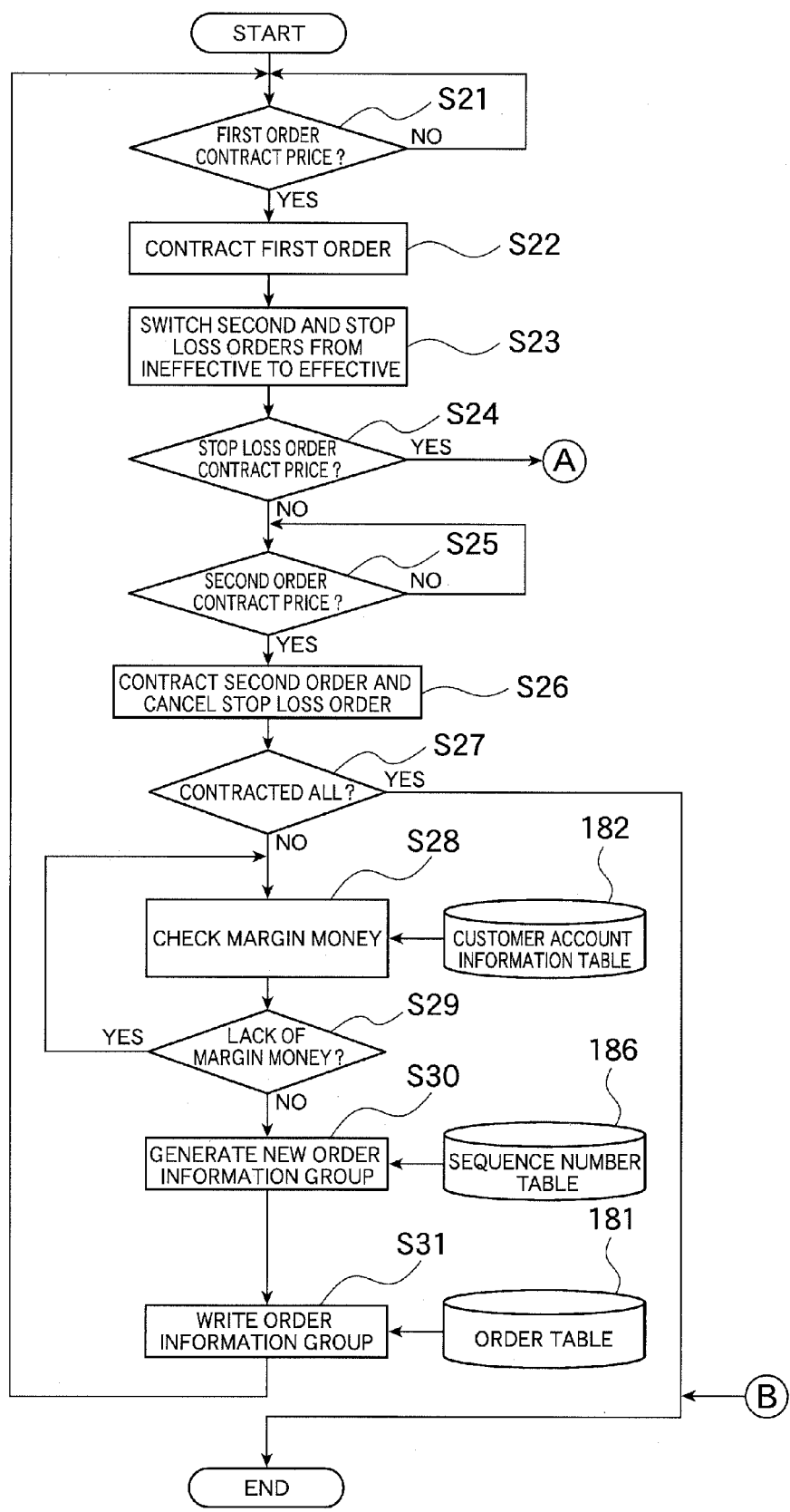
FIG. 6A is a flowchart showing the processing of the transaction management system according to the present embodiment.
Figure 7A:
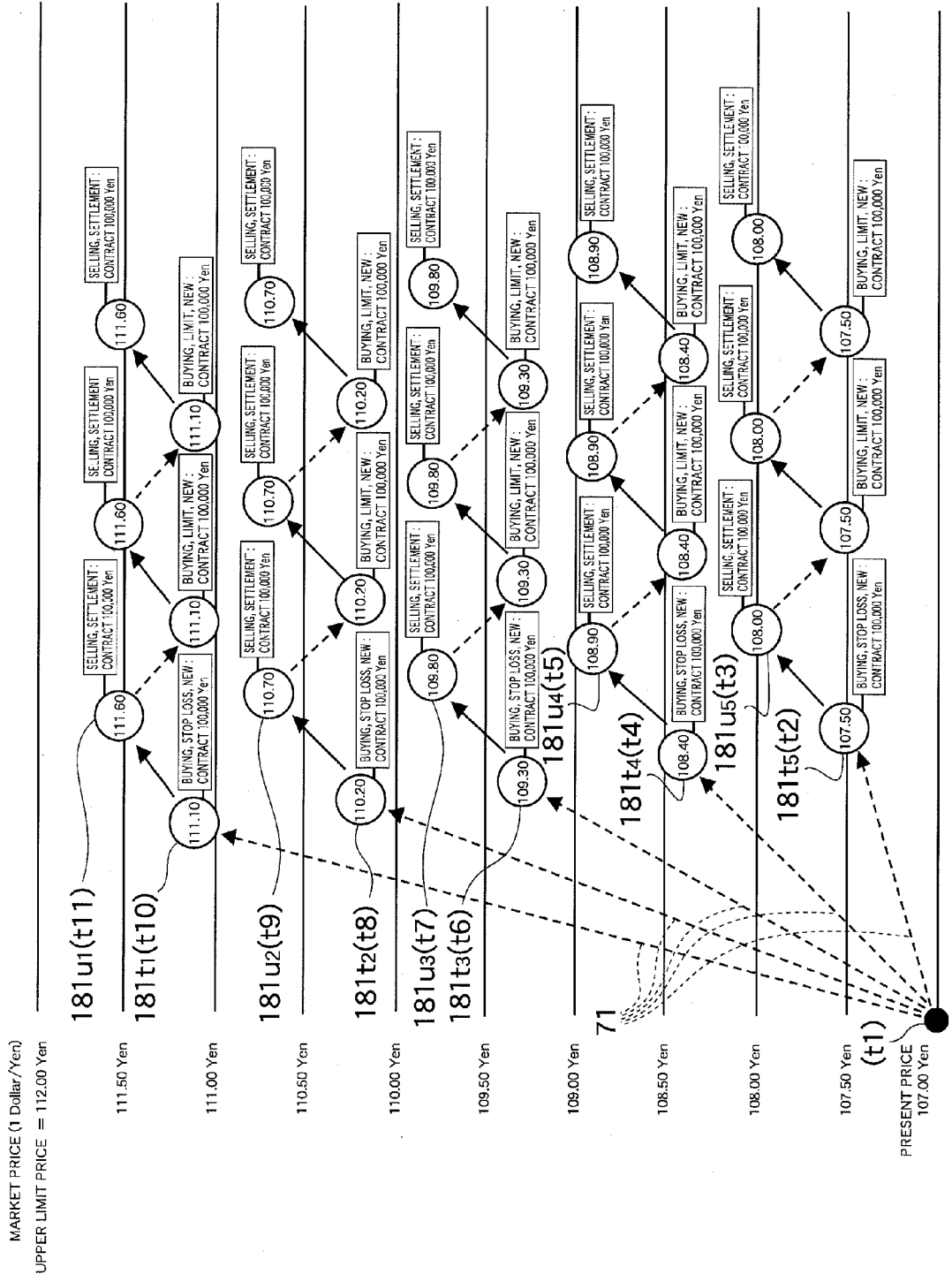
FIG. 7A is a flowchart showing the processing of the transaction management system according to the present embodiment.
Figure 7B:
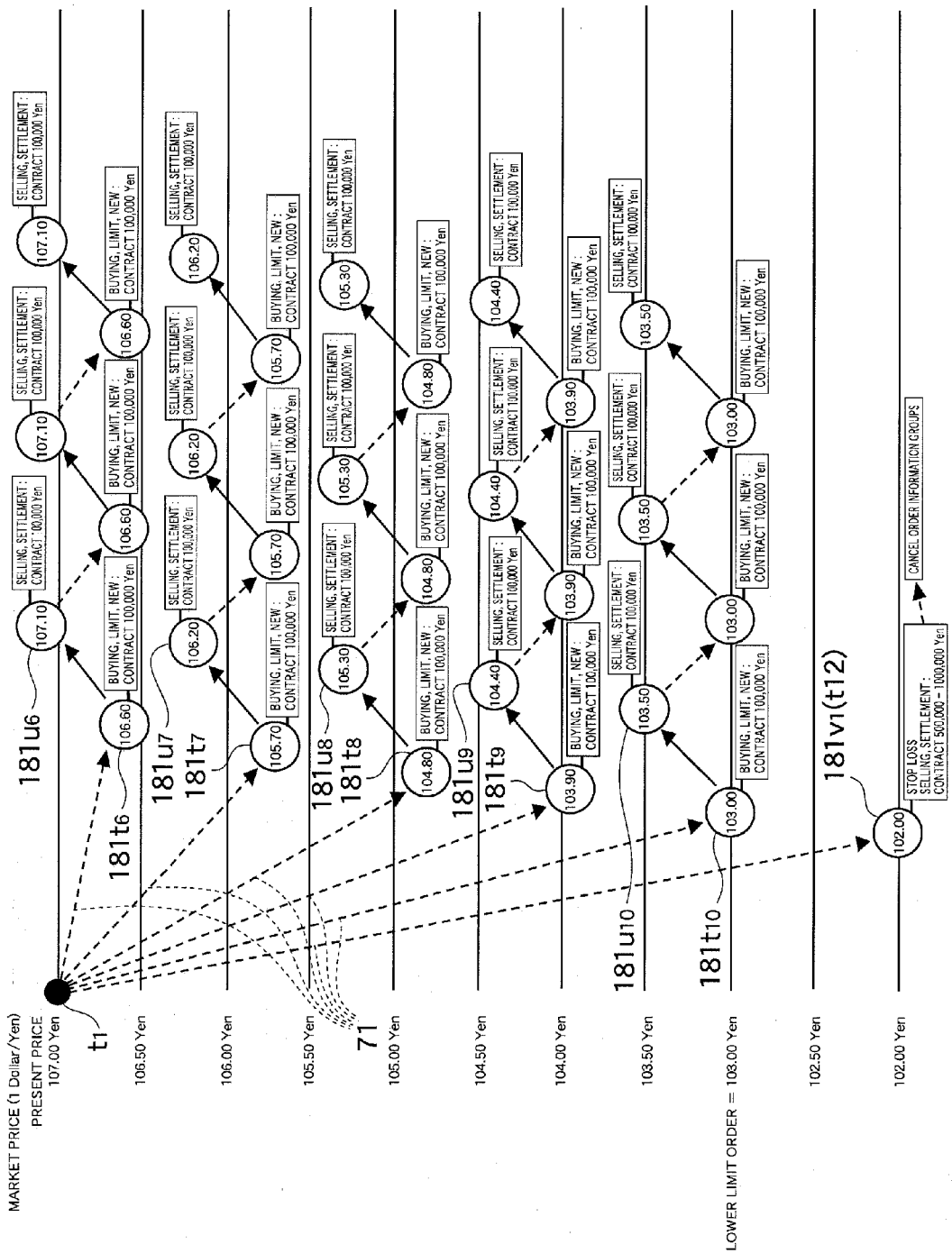
FIG. 7B is a flowchart showing the processing of the transaction management system according to the present embodiment.
Figure 8:
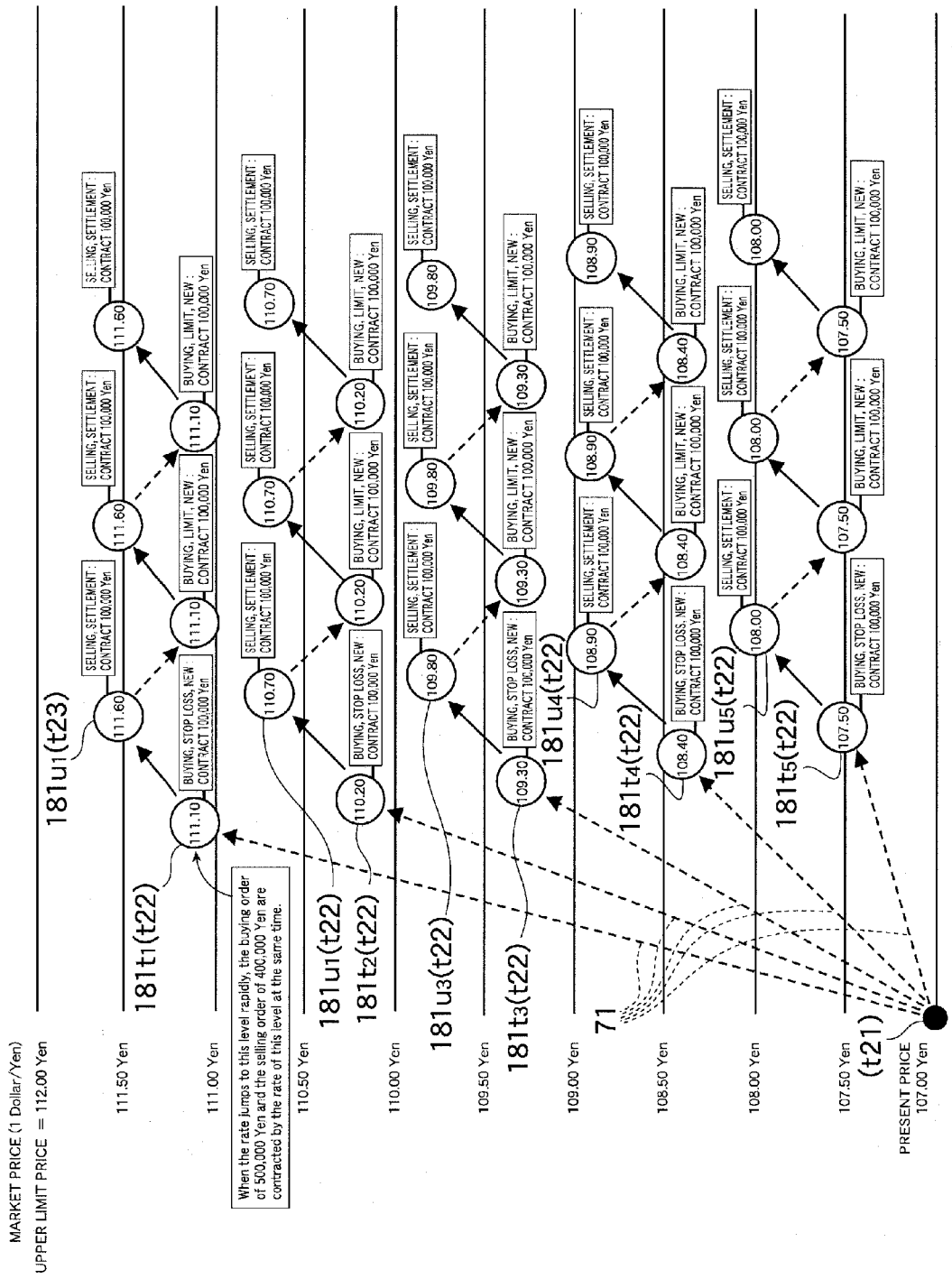
FIG. 8 is a flowchart showing the processing of the transaction management system according to the present embodiment.

FIGS. 6A and 6B are the flowcharts showing the procedures when the financial product transaction management device 1 processes the limit order based on the trap-repeat-if-done-order. FIGS. 7A, 7B, 8 and 9 are conceptual diagrams showing the procedures when the financial product transaction management device 1 executes the processing for contracting the limit order based on the trap-repeat-if-done-order. In FIGS. 7A, 7B and 8, each of circular symbols indicates one order information corresponding to one position. Hereinafter, the procedures for processing the trap-repeat-if-done-order is described with referencing these drawings.

The price information receiving management unit 19 of the financial product transaction management device 1 repeats to acquire the information related to the exchange rate, even after the completion of the order receipt processing.

As shown in FIGS. 7A and 7B, the contract information generation unit 14 changes the value of each effective/ineffective information 181K corresponding to the first orders 181$t$1-181$t$10 of first round (i.e. the orders in which the order number 181A are from 1000 to 1029 in FIGS. 5A and 5B) from 'ineffectiveness' to 'effectiveness' at the time point t1, that is, at the time when the receipt processing of the limit order corresponding to the trap-repeat-if-done-order is completed. As a result, the buying limit orders corresponding to the first orders 181$t$1-181$t$10 are taken place. At this time, the orders of the second round (i.e. orders in which the order number 181A are equal to or later than 1030) are kept to the condition in which the effective/ineffective information 181K are set to be 'ineffective'. In addition, the second orders 181$u$1-181$u$10 and the stop loss orders 181$v$1-181$v$10 in the orders of first round are kept to the condition in which the effective/ineffective information 181K are set to be 'ineffective'. In other words, the second orders 181$u$1-181$u$10 and the stop loss orders 181$v$1-181$v$10 are ineffective order information at the time point t1.

In the example of FIG. 7A, the market purchase price 71 of the US dollar is 107.00 Yen per dollar. Hereinafter, the example in which the market price rises gradually up to 112.00 Yen per dollar is described. In this example, the market purchase price 71 becomes 107.50 Yen per dollar, which is the same value as the order price 181G of the first order 181$t$5 (see step S21 of FIG. 6A). Then, the contract information generation unit 14 executes the processing for contracting the first order 181$t$5 of this position (see step S22 of FIG. 6A).

Figure 9:
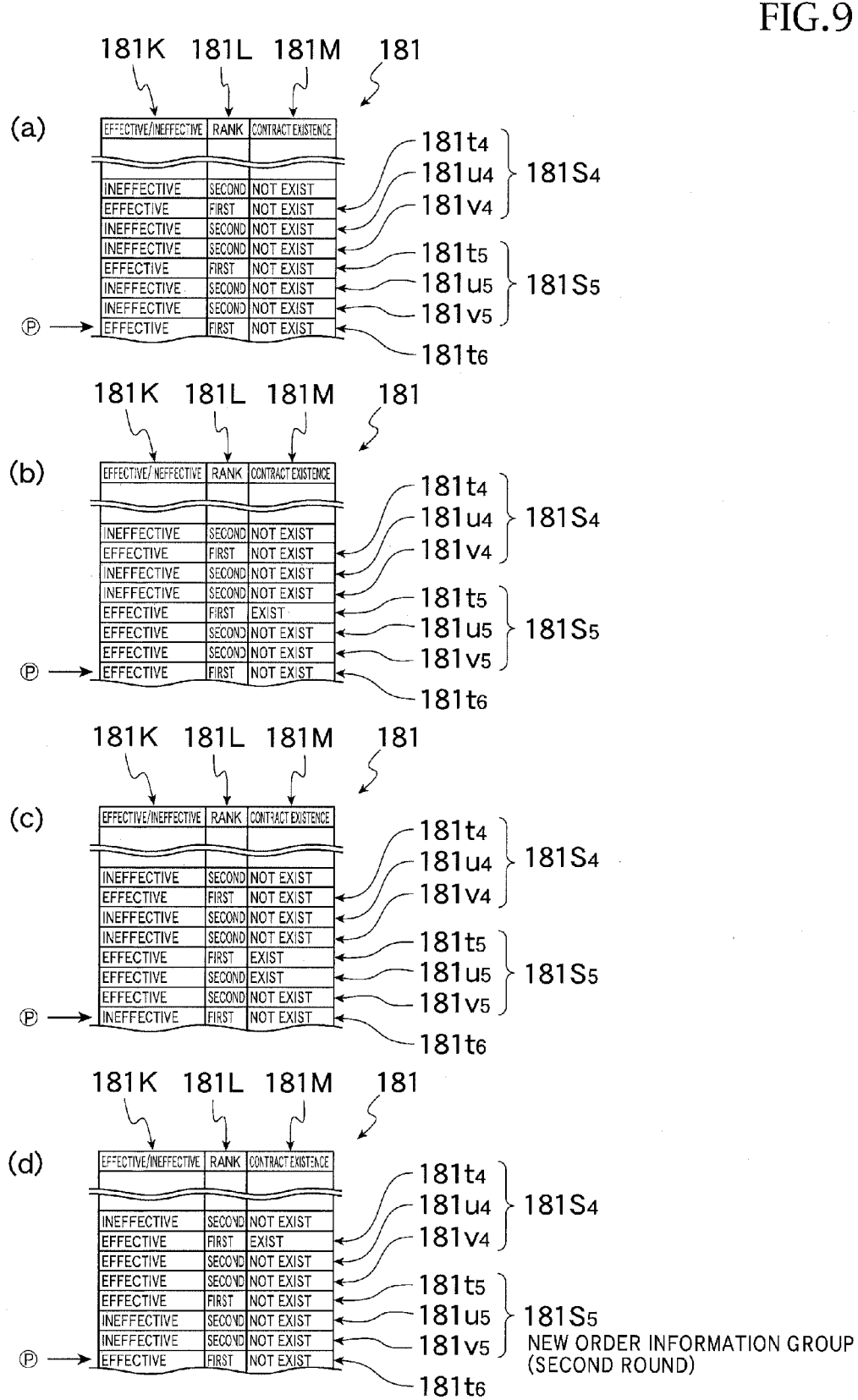
FIG. 9 is a conceptual diagram showing the processing of the transaction management system according to the present embodiment.

Concretely, when the order corresponding to the first order 181$t$5 contracts, the contract information generation unit 14 changes the contract existence information 181M corresponding to the first order 181$t$5 from 'not exist' to 'exist' (see diagrams (a) and (b) of FIG. 9). Then, responding to the command of the contract information generation unit 14, the account information generation unit 15 changes the margin money information (described below) depending on the changing of the trading amount. Next, the account activity information generation unit 13 writes the condition of received money and sink money to the list of the account activities. Then, the contract information generation unit 14 makes the display unit 22 of the client terminal 2 to display character information etc. indicating the completion of the contract, and executes the processing related to the activity of the bank account corresponding to the client terminal 2 based on the trading price. The same processing are executed by the financial product transaction management device 1 in each contract process described below.

Incidentally, regarding the plural buying orders corresponding to the first order 181$t$5, the order price 181G of the first contracted order is higher than the market purchase price at the time point t1 (i.e. 107.00 Yen per dollar), therefore, this order is a new stop loss order. In contrast, each order price 181G of the second or any subsequent contracted buying orders is lower than the order price 181G of the second order 181$u$5 which is the selling order contracted just before said buying order, therefore, these orders are new limit orders. Other first orders 181$t$1-181$t$4 shown in FIG. 7A are the same as the first order 181$t$5.

When the first order 181$t$5 needs to be contracted, the contract information generation unit 14 completes the contract even when the slippage (that is, a difference between the order price and the contract price) occurs. For example, the contract information generation unit 14 completes the contract not only when the market price is equal to 107.50 Yen per dollar, but also when the market price rises over 107.50 Yen per dollar (e.g. when the market price reaches 107.70 Yen per dollar). The contract information generation unit 14 executes the same processing at each contract processing described below.

In addition, when the first order 181$t$5 is contracted, the contract information generation unit 14 changes the value of the effective/ineffective information 181K of the second order 181$u$5 and the stop loss order 181$v$5 from 'ineffectiveness' to 'effectiveness' as shown in diagram (b) of FIG. 9 (see step S23 of FIG. 6A).

Then, when the market purchase price of US dollar falls down to the price of the stop loss order 181$v$5 ('Yes' of the step S24), the contract processing of the stop loss order 181$v$5 described below is executed. In the present embodiment, the price of the stop loss order 181$v$5 is 102.50 Yen per dollar, as described above. Incidentally, when the market purchase price of the US dollar rises up to the price of the second order 181$u$5 without falling down to that of the stop loss order 181$v$5 (see 'Yes' of the step S25 and time point t3 of FIG. 7A), the contract information generation unit 14 contracts the limit order corresponding to this second order 181$u$5 (see step S26 of FIG. 6A). In the present embodiment, the contract price of this case is 108.00 Yen per dollar. In this contract processing, the value of contract existence information 181M corresponding to the second order 181$u$5 is changed to 'not exist' to 'exist' (see the diagram (c) of FIG. 9), and the processing for canceling the stop loss order 181$v$5 is executed (see step S26). Concretely, the contract information generation unit 14 executes the processing for canceling the stop loss order and makes the display unit 22 of the client terminal 2 to display the information concerning this cancellation. Then, the contract information generation unit 14 selects the fifth order information group 181S5 (not shown in Figures) from among the order information group corresponding to the second round of the order table 181. Next, the contract information generation unit 14 changes the value of the effective/ineffective information 181K corresponding to the first order 181$t$5 of the selected order information group 181S1 from 'ineffectiveness' to 'effectiveness'. Incidentally, regarding the step S25 of FIG. 6A, the comparison between the market purchase price 72 and the stop loss order price can be repeated by making the processing to return to the step S24 when the market purchase price 72 of US dollar is lower than the price of the second order 51c.

When the market purchase price 71 becomes equal to the price of the first order 181t4 in FIG. 7A (see time point t4), the contract information generation unit 14 changes the value of the contract existence information 181M from 'not exist' to 'exist' and changes the values of the effective/ineffective information 181K of the second order 181u4 and the stop loss order 181v5 from 'ineffectiveness' to 'effectiveness' (see the diagram (c) of FIG. 9). The later processing are same as that of the order information group 181S5 described above. Moreover, the processing when the market purchase price 71 becomes equal to the prices of the first orders 181t1-181t3 is same as that of the order information group 181S5 described above.

Next, a case where the market purchase price 71 suddenly changes between the time point t21 and the time point t22 (for example, the market purchase price 71 suddenly rises up to 111.10 Yen per dollar, that is, the price of the first order 181t1) is described with referencing FIG. 8. For example, the market purchase price 71 often changes suddenly on the days after the market holidays and when the market price suddenly rises or suddenly falls. The example of FIG. 8 indicates the case where the market purchase price 71 rises suddenly. In this case, the contract information generation unit 14 executes processing of the steps S21 to S23 corresponding to the first orders 181t1 to 181t5 virtually concurrently. As a result, the stop loss orders corresponding to the first orders 181t1 to 181t5 are contracted virtually simultaneously (see step S22). Additionally, the contract existence information 181M of the second orders 181u1-181u5 are changed from 'not exist' to 'exist' (see step S23). Moreover, the contract information generation unit 14 contracts the limit orders corresponding to these second orders 181u2-181u5, because the market purchase price 71 (i.e. 111.10 Yen per dollar) is higher than the price of the second order 181u2-181u5 (see step S26 of FIG. 6A). As a result, the buying order of 500,000 Yen and the selling order of 400,000 Yen are simultaneously contracted at the time point t22 of FIG. 8.

FIG. 7B shows an example of a case where the market price of US dollar falls down gradually. In this case, the processing of the steps S21 to S26 are executed in the same manner as the case shown in FIG. 7A. In the case shown in FIG. 7B, the first contract of the first order 181t6-181t10 is a new limit order because the order price 181G is lower than the market purchase price (i.e. 107.00 Yen per dollar) at the time point t1.

After the processing of the step S26, whether all order information 181S1-181S10 are contracted is checked (see step S27). Then, in the case where a non-contracted order information exists ('No' of the step S27), the account information generation unit 15 acquires the margin money information of the customer from the customer account information table 182 once again. Next, the order input receiving unit 12 compares the acquired margin money information and the order permitted amount of the customer once again (see step S28). When the amount of the margin money is lower than the order permitted amount ('Yes' of the step S29), the processing are reserved until the amount of the margin money becomes equal to or more than the order permitted amount. In contrast, when the amount of the margin money is equal to or more than the order permitted amount ('No' of the step S29), the order information generation unit 16 newly generates the order information group corresponding to the second order contracted at the step S26 (see step S30). At the same time, the order information generation unit 16 sets the value of the effective/ineffective information 181K of the first order belonging to the generated order information group to 'effective' and keeps the value of the effective/ineffective information 181K of the second order and the stop loss order belonging to it to 'ineffective'.

Similarly to the above described step S9, the order information generation unit 16 records the generated order information group to the order table 181 (the step S31). Then, the processing after the step S21 are repeated.

The above described processing are repeated until when each of the order information groups corresponding to all positions is generated and the processing of the steps S22 and S26 concerning all positions are executed ('No' of the step S27). Then, the processing according to the present embodiment finishes when the contract processing corresponding to all positions are completed ('Yes' of the step S27).

In the case where the market purchase price 71 of US dollar reaches the stop loss order price after the processing of the step S23 described above (see step S24), the contract information generation unit 14 contracts the corresponding stop loss order (see step S32). In the example of FIG. 7B, the market purchase price 71 falls down to 102.50 Yen per dollar, that is the contract price of the stop loss order 181v1, at the time point t12. For example, when the market purchase price 71 falls down to the contract price of the stop loss order 181v1 after buying the US dollar corresponding to the first order 181t1, the contract information generation unit 14 sells these US dollar by contracting the stop loss order 181v1. As a result, the damage of customer can be suppressed to minimum when the market of the financial product highly changes from the conventional market and the recovery cannot be anticipated for some time.

When the stop loss orders 181v1-181v10 are contracted, the contract information generation unit 14 specifies the order information groups corresponding to the contracted stop loss orders and executes the processing for canceling the second orders belonging to the specified order information groups (see step S33 of FIG. 6B). The contract information generation unit 14 does not generate the new order information group, after contracting one of stop loss orders 181v1-181v10 (see step S30 of FIG. 6A). For this, the contract information generation unit 14 executes the processing for canceling the not-generated order information groups (see step S34 of FIG. 6B). For example, in the case where the first order 181t1 is contracted (see the time point t10 of FIG. 7A) and then the stop loss order 181v1 is contracted (see the time point t12 of FIG. 7B), the contract information generation unit 14 executes the cancellation processing of the second order 181u1 which is effective and is not contracted at the time point t12 (see step S33) and then deletes all of the not-generated order information groups at the time point t12 from among the order information groups recorded in the order table 181 (see step S34). Next, the contract information generation unit 14 makes the display unit 22 of the client terminal 2 to display the information that these cancellation processing are executed. By such cancellation processing, all of the trading can be stopped after contracting anyone of the stop loss orders. As a result, the damage of customer can be suppressed to minimum when the market of the financial product highly changes from the conventional market and the recovery cannot be anticipated for some time.

When a request for changing the price and the amount of the limit orders once completed is received from the client terminal 2, the financial product transaction management device 1 according to the present embodiment determines the request to be invalid and executes the input error processing.

In this error processing, the data or signal communication between the financial product transaction management device 1 and the banking facility for meeting the request, for example, the communication for changing the data in the order table 181, for generating and changing the data related to the account information generation unit 15 and the account activity information generation unit 13 etc. are not established. In this error processing, the display unit 22 of the client terminal 2 displays the occurrence of input error. As a result, the financial product trader, that is the bank, can prevent an increase of affairs caused by frequent requests for changing the price or the amount.

As described above, the client terminal 2 according to the present embodiment can display the button for requesting the cancellation of the order (not shown in Figures). When the customer clicks the cancellation button, the contract information generation unit 14 of the financial product transaction management device 1 specifies the order information group corresponding to the cancellation request, selects the second order and the stop loss order in which the contracts are not completed from among the specified order information group, and then, executes the cancellation processing of the selected order. In the example of FIG. 7A, the second order 181$u$5 and the stop loss order 181$v$5 (not shown in Figures) are canceled when the cancellation request for the order information group 181S5 is received between the time point t2 and t3.

By executing such cancellation processing, the management of the stop loss order corresponding to the if-done-order can be simplified.

The financial product transaction management device 1 can also be constituted to cancel the not-generated order information groups corresponding to the order information to which the cancellation is requested (see step S30 of FIG. 6A). Moreover, the financial product transaction management device 1 can be constituted to cancel the order information corresponding to other order information groups previously generated, when a cancellation of any order information group is requested. In addition, the financial product transaction management device 1 can be constituted to execute the cancellation processing of the previously-generated order information group corresponding to the cancellation request, the previously-generated order information groups not corresponding to the cancellation request and all of the not-generated order information groups, when any of the not-generated order information groups is requested to be canceled.

When the order received from the client terminal 2 is a normal market order (that is, the order form in which the transaction of the financial product is performed by the price at the time the order is executed), the contract by the contract information generation unit 14 is executed immediately after the generation of the order information (see step S8 of FIG. 3). In this case, the processing corresponding to the step S9 of FIG. 3 and the processing corresponding to FIGS. 6A and 6B are not executed.

As described above, the financial information transaction management device 1 according to the present embodiment generates plural order information groups in which order prices are different from each other and executes the processing corresponding to these order information groups concurrently. Therefore, the present embodiment can execute plural if-done-orders concurrently by simple operations. Moreover, the present embodiment can automatically stop these if-done-orders based on the market condition. Therefore, according to the present embodiment, the convenience of the customer can increase and the risk of the customer can decrease.

After both of the first and second orders belonging to the same order information group are contracted, the financial information transaction management device 1 according to the present embodiment generates the same order information group as this contracted order information group once more and executes it. Therefore, the execution of the same if-done-order can be repeated. As a result, according to the present embodiment, the customer can execute the repeat-if-done-order without a complex order procedure.

The financial information transaction management device 1 according to the present embodiment executes the trading even when the slippage occurs. Therefore, the present embodiment can easily complete the contract corresponding to the first orders 181$t$1-181$t$10 and the second orders 181$u$1-181$u$1. This advantage is effective for reducing the risk of the customer.

In the present embodiment, the first orders 181$t$1-181$t$10 and the second orders 181$u$1-181$u$10 contain the currency pair information 181C, the trade direction information 181F, the order amount information 181D and the order type information 1811 as the attribute information. Therefore, the present embodiment can specify the subject matter of the if-done-orders with simple operations.

The embodiment described hereinabove is an example of the present invention, and it is obvious that the present invention is not limited to the present embodiment.

For example, the present embodiment is described based on an example in which the present invention is applied to the system for executing the trading of the foreign exchange, however, the present invention can be applied to the system for managing other financial products (e.g. the stock certificate, the bond certificate and so on).

Moreover, the present embodiment is described based on an example in which the buying order corresponds to 'the first order' and the selling order corresponds to 'the second order', however, the present invention can be applied to the case where the selling order corresponds to 'the first order' and the buying order corresponds to 'the second order'.

In the financial product transaction management system 1A according to the embodiment described above, the contract information generation unit 14 and the order table 181 are located in one server system with other components. However, in the case where plural management device 1 are connected to the Internet 3 using communication technology, it is not necessary that all of the management devices 1 comprise the contract information generation unit 14 and/or the order table 181. In this case, the management device 1 not comprising the contract information generation unit 14 and/or the order table 181 may use the contract information generation unit 14 and the order table 181 located in other management devices 1 through the Internet 1. Moreover, it is possible to make all of the management devices 1 not to comprise the contract information generation unit 14 and/or the order table 181. In this case, the contract information generation unit 14 and the order table 181 are located in the external system (that is, the system other than the management device 1), and the management devices 1 may use them. The external system may be connected to the Internet 3 using the communication technology or be connected to any of the management device 1 using a private circuit.

Descriptions of Reference Symbols

1A financial product transaction management system
1 financial product transaction management device
2, 2-1 to 2-$n$ client terminal
12 order input receiving unit 14 contract information generation unit
16 order information generation unit
181 order table
181K effective/ineffective information
19 price information receiving management unit
181S1 to 181S10 order information group
181*t*1 to 181*t*10 first order information
181*u*1 to 181*u*10 second order information
181*v*1 to 181*v*10 stop loss order information

What is claimed is:

1. A transaction management device, comprising:
an order receiving unit that receives trade order application information;
an order information generation unit that generates for the received trade order application information, a plurality of order information groups, each order information group contains a first order for executing one of buying or selling of a financial product at a first order price, a second order for fixing a profit by selling the financial product bought by the first order at a second order price higher than the first order price or by buying the financial product sold by the first order at a second order price lower than the first order price and a stop loss order for stopping an increase of loss by selling the financial product bought by the first order at a stop loss order price lower than the first order price or by buying the financial product sold by the first order at a stop loss order price higher than the first order price;
a memory unit that stores the order information groups generated by the order information generation unit; and
a contract information generation unit that sets the first order to an effective status that is an active status for contracting the trade order, the second order to an ineffective status that is a stand-by status and a stop loss order to the ineffective status, responsive to start of a transaction processing of a corresponding order information group, wherein:
the order information generation unit performs processing for,
acquiring a number of traps corresponding to a number of order information groups to be generated, a price range for the traps and an amount of profit, based on the trade order application information,
computing a first order price and a second order price so that a number of the order information groups generated and executed collaterally corresponds to the number of the traps, price intervals between the first order prices and price intervals between the second order prices among the order information groups are equal to the price range for the traps, and each of differences between the first and second order prices belonging to same order information group is the amount of profit,
wherein:
the contract information generation unit performs on an order information group from the plurality of generated order information groups basis processing for,
contracting a first order and switching setting of a second order and a stop loss order to an effective status regardless of whether contract processing corresponding to other order information groups is completed, when a first order of one of the order information groups is set to an effective status and a market price reaches the first order price,
contracting a second order and generating a new order information group corresponding to the order information group with the contracted second order regardless of whether contract processing corresponding to other order information groups is completed, when a second order of one of the order information groups is set to an effective status and a market price reaches the second order price.

2. The transaction management device according to claim 1, wherein:
the order information generation unit acquires an upper limit price and a lower limit price of trading from the order information receiving unit, and
the order information generation unit sets for the plurality of generated order information groups a highest price among second order prices to be equal to or lower than the upper limit price, and a lowest price among the second order prices to be equal to or higher than the lower limit price.

3. The transaction management device according to claim 1, wherein:
the order information generation unit acquires an upper limit price and a lower limit price of trading from the order information receiving unit, and
the order information generation unit sets for the plurality of generated order information groups a highest price among first and second order prices to be equal to or lower than the upper limit price, and a lowest price among first and second order prices to be equal to or higher than the lower limit price.

4. The transaction management device according to claim 1, wherein:
the order information generation unit acquires an upper limit price and a lower limit price of trading from the order information receiving unit, and
the order information generation unit sets for the plurality of generated order information groups a highest price among first order prices to be equal to or lower than the upper limit price, and a lowest price among the first order prices to be equal to or higher than the lower limit price.

5. The transaction management device according to claim 1, wherein for the plurality of generated order information groups all of the stop loss order prices are the same.

6. The transaction management device according to claim 1, wherein the order information generation unit sets a number of traded financial products of each order information group that is generated based on same trade order application information to be same.

7. The transaction management device according to claim 1, wherein the contract information generation unit cancels subsequent generations of order information groups corresponding to an order information group of which a stop loss order is contracted, after the stop loss order is contracted.

8. The transaction management device according to claim 1, wherein the contract information generation unit extracts an order information group containing order information corresponding to an order to which a cancellation is requested and cancels order information still not contracted and contained in the extracted order information group, when a cancellation to the order information group previously generated is requested.

9. The transaction management device according to claim 1, wherein the contract information generation unit contracts the first or second orders when a slippage occurs.

10. The transaction management device according to claim 1, wherein each of the first orders and/or each of the second orders has attribute information containing a currency pair information, a trade direction information, an order price information or a repeat information.

11. The transaction management device according to claim 1, wherein the financial product is a foreign exchange.

12. A non-transitory computer-readable storage medium having recorded thereon a computer program for causing a computer to operate as a transaction management device that executes:

receiving trade order application information;

generating for the received trade order application information, a plurality of order information groups, each order information group contains a first order for executing one of buying or selling of a financial product at a first order price, a second order for fixing a profit by selling the financial product bought by the first order at a second order price higher than the first order price or by buying the financial product sold by the first order at a second order price lower than the first order price and a stop loss order for stopping an increase of loss by selling the financial product bought by the first order at a stop loss order price lower than the first order price or by buying the financial product sold by the first order at a stop loss order price higher than the first order price; and generating contract information by setting the first order to an effective status that is an active status for contracting the trade order, the second order to an ineffective status that is a stand-by status and a stop loss order to the ineffective status, responsive to start of a transaction processing of corresponding order information group, wherein:

the generation of the order information groups further contains processing for, acquiring a number of traps corresponding to a number of order information groups to be generated, a price range for the traps and an amount of profit, based on the trade order application information, computing a first order price and a second order price so that a number of the order information groups generated and executed collaterally corresponds to the number of the traps, price intervals between the first order prices and price intervals between the second order prices are equal to the price range for the traps, and each of differences between the first and second order prices belonging to same order information group is the amount of profit, wherein:

the generation of the contract information further performs on an order information group from the plurality of generated order information groups basis processing for, contracting a first order and switching setting of a second order and a stop loss order to an effective status regardless of whether the contract processing corresponding to other order information groups is completed, when a first order of one of the order information groups is set to an effective status and a market price reaches the first order price, contracting a second order and generating a new order information group corresponding to the order information group with the contracted second order regardless of whether contract processing corresponding to other order information groups is not completed, when a second order of one of the order information groups is set to an effective status and a market price reaches the second order price.

* * * * *

UNITED STATES PATENT AND TRADEMARK OFFICE
CERTIFICATE OF CORRECTION

PATENT NO. : 8,392,316 B2
APPLICATION NO. : 12/937464
DATED : March 5, 2013
INVENTOR(S) : Hisatoshi Yamamoto et al.

Page 1 of 1

It is certified that error appears in the above-identified patent and that said Letters Patent is hereby corrected as shown below:

On the Title Page, Item [75], Delete "Hitsohi" and insert --Hitoshi--, therefor.

Signed and Sealed this
Second Day of July, 2013

Teresa Stanek Rea
*Acting Director of the United States Patent and Trademark Office*